United States Patent
Meguro et al.

(10) Patent No.: US 11,817,548 B2
(45) Date of Patent: Nov. 14, 2023

(54) ALL SOLID-STATE SECONDARY BATTERY, INORGANIC SOLID ELECTROLYTE PARTICLES, SOLID ELECTROLYTE COMPOSITION, ELECTRODE SHEET FOR BATTERY, AND METHOD FOR MANUFACTURING ALL SOLID-STATE SECONDARY BATTERY

(71) Applicant: FUJIFILM Corporation, Tokyo (JP)

(72) Inventors: Katsuhiko Meguro, Ashigarakami-gun (JP); Hiroaki Mochizuki, Ashigarakami-gun (JP); Masaomi Makino, Ashigarakami-gun (JP); Tomonori Mimura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 792 days.

(21) Appl. No.: 16/853,198

(22) Filed: Apr. 20, 2020

(65) Prior Publication Data
US 2020/0251774 A1 Aug. 6, 2020

Related U.S. Application Data

(60) Division of application No. 15/403,471, filed on Jan. 11, 2017, now Pat. No. 10,763,542, which is a
(Continued)

(30) Foreign Application Priority Data

Jul. 31, 2014 (JP) .................................. 2014-156838

(51) Int. Cl.
*H01M 10/0562* (2010.01)
*H01M 10/0585* (2010.01)
(Continued)

(52) U.S. Cl.
CPC ......... *H01M 10/0562* (2013.01); *H01M 4/62* (2013.01); *H01M 10/0525* (2013.01);
(Continued)

(58) Field of Classification Search
None
See application file for complete search history.

(56) References Cited

U.S. PATENT DOCUMENTS

| 5,518,187 A | 5/1996 | Bruno et al. |
| 2007/0231704 A1 | 10/2007 | Inda |

(Continued)

FOREIGN PATENT DOCUMENTS

| CN | 1320284 A | 10/2001 |
| CN | 1661835 A | 8/2005 |

(Continued)

OTHER PUBLICATIONS

Machine translation of JP 2012-193051 A (Year: 2012).*
(Continued)

*Primary Examiner* — Robert S Carrico
(74) *Attorney, Agent, or Firm* — Birch, Stewart, Kolasch & Birch, LLP

(57) ABSTRACT

Provided are an all solid-state secondary battery capable of exhibiting an improved ion-conducting property regardless of troublesome manufacturing steps or special materials, inorganic solid electrolyte particles, a solid electrolyte composition, an electrode sheet for a battery, and a method for manufacturing an all solid-state secondary battery.

An all solid-state secondary battery comprising: a positive electrode active material layer; a negative electrode active material layer; and an inorganic solid electrolyte layer between the positive and negative electrode active material layers, in which inorganic solid electrolyte particles satisfying all of the following data A are included in at least any
(Continued)

layer of the positive electrode active material layer, the negative electrode active material layer, or the inorganic solid electrolyte layer:

<data A> a boundary length of a projected particle of the inorganic solid electrolyte particle is represented by L;

a cross-sectional area of the projected particle of the inorganic solid electrolyte particle is represented by A;

an unevenness coefficient FU represented by Expression (1) below is in a range of 0.85 or more and 1 or less;

$$FU = 4\pi A/L^2 \qquad (1).$$

6 Claims, 3 Drawing Sheets

Related U.S. Application Data continuation of application No. PCT/JP2015/071552, filed on Jul. 29, 2015.

(51) Int. Cl.
  *H01M 4/62* (2006.01)
  *H01M 10/0525* (2010.01)

(52) U.S. Cl.
  CPC ............ *H01M 10/0585* (2013.01); *H01M 2300/0068* (2013.01); *H01M 2300/0071* (2013.01); *Y02T 10/70* (2013.01)

(56) References Cited

U.S. PATENT DOCUMENTS

| | | | |
|---|---|---|---|
| 2009/0123847 A1 | 5/2009 | Okada et al. | |
| 2010/0273062 A1 | 10/2010 | Tsuchida et al. | |
| 2012/0115028 A1 | 5/2012 | Ueno et al. | |
| 2013/0040206 A1 | 2/2013 | Yoshida et al. | |
| 2014/0141339 A1 | 5/2014 | Sugiura et al. | |
| 2014/0295260 A1 | 10/2014 | Sugiura et al. | |

FOREIGN PATENT DOCUMENTS

| | | |
|---|---|---|
| CN | 102197520 A | 9/2011 |
| CN | 102823049 A | 12/2012 |
| CN | 102859780 A | 1/2013 |
| CN | 103650062 A | 3/2014 |
| JP | 62-149354 A | 7/1987 |
| JP | 6-7699 A | 1/1994 |
| JP | 2003-175341 A | 6/2003 |
| JP | 2008-110899 A | 5/2008 |
| JP | 2008-176981 A | 7/2008 |
| JP | 2010-90003 A | 4/2010 |
| JP | 2012-129150 A | 7/2012 |
| JP | 2012-193051 A | 10/2012 |
| JP | 2012-243476 A | 12/2012 |
| JP | 2013-143297 A | 7/2013 |
| JP | 2013-257992 A | 12/2013 |
| JP | 2014-41720 A | 3/2014 |
| JP | 2014-49229 A | 3/2014 |
| JP | 5445527 B2 | 3/2014 |
| JP | 2014-86174 A | 5/2014 |
| WO | WO 2011/105574 A1 | 9/2011 |

OTHER PUBLICATIONS

Machine translation of JP 2010-090003 A (Year: 2010).*
Machine translation of JP 2012-243476 A (Year: 2012).*
Chinese Office Action and Search Report for corresponding Chinese Application No. 201580036922.0, dated Sep. 4, 2018, with English translation.
English translation of the International Preliminary Report on Patentability and Written Opinion of the International Searching Authority (Forms PCT/IB/373 and PCT/ISA/237) for International Application No. PCT/JP2015/071552, dated Jan. 31, 2017.
International Search Report for PCT/JP2015/071552 dated Oct. 20, 2015.
Japanese Office Action dated Mar. 27, 2018 for Japanese Application No. 2016-538409, with English translation.
Japanese Office Action dated Sep. 11, 2018 for corresponding Japanese Application No. 2016-538409, with English translation.
Japanese Office Action for Japanese Application No. 2016-538409, dated Nov. 5, 2019, with an English translation.
Office Action dated Dec. 19, 2019 in U.S. Appl. No. 15/403,471.
Office Action dated Jun. 12. 2019 in U.S. Appl. No. 15/403,471.
Restriction Requirement dated Apr. 16, 2019 in U.S. Appl. No. 15/403,471.
Written Opinion of the International Searching Authority for PCT/JP2015/071552 (PCT/ISA/237) dated Oct. 20, 2015.

* cited by examiner

FU=1

FU<1

FU<1

LENGTH OF PARTICLE
SANDWICHED BETWEEN
PARALLEL LINES
= FERET'S DIAMETER F

ALL SOLID-STATE SECONDARY BATTERY, INORGANIC SOLID ELECTROLYTE PARTICLES, SOLID ELECTROLYTE COMPOSITION, ELECTRODE SHEET FOR BATTERY, AND METHOD FOR MANUFACTURING ALL SOLID-STATE SECONDARY BATTERY

CROSS-REFERENCE TO RELATED APPLICATIONS

This application is a Division of U.S. patent application Ser. No. 15/403,471 filed on Jan. 11, 2017, which is a Continuation of PCT International Application No. PCT/JP2015/071552 filed on Jul. 29, 2015, which claims priority under 35 U.S.C. § 119 (a) to Japanese Patent Application No. JP2014-156838 filed in Japan on Jul. 31, 2014. Each of the above applications is hereby expressly incorporated by reference, in its entirety, into the present application.

BACKGROUND OF THE INVENTION

1. Field of the Invention

The present invention relates to an all solid-state secondary battery, inorganic solid electrolyte particles, a solid electrolyte composition, an electrode sheet for a battery, and a method for manufacturing an all solid-state secondary battery.

2. Description of the Related Art

At present, in a number of versatile lithium ion batteries, an electrolytic solution is used. Attempts are underway to substitute this electrolytic solution with a solid electrolyte so as to constitute lithium ion batteries with only solid materials. Among these attempts, techniques of using an inorganic solid electrolyte have advantages of reliability and stability during use. As electrolytic solutions that are used in lithium ion secondary batteries, flammable materials such as carbonate-based solvents are applied. Therefore, a variety of countermeasures are being employed; however, still, there is a demand for additional countermeasures for overcharging and the like. A solution to this demand is all solid-state secondary batteries in which a non-flammable inorganic compound is used as the electrolyte. Inorganic solid electrolytes also have an advantage of, generally, exhibiting a stronger ion-conducting property than high-molecular-weight electrolytes.

Another advantage of all solid-state secondary batteries is their suitability for an increase in the energy density by means of electrode stacking. Specifically, electrodes and electrolytes can be directly arranged and serialized in batteries. At this time, metal packages for sealing battery cells and copper lines or busbars for connecting the battery cells may not be provided, and thus it is possible to significantly increase the energy density of batteries. In addition, favorable compatibility with positive electrode materials capable of increasing the potential and the like are also said to be still another advantage.

Due to the respective advantages described above, development of all solid-state secondary batteries as next-generation lithium ion secondary batteries actively proceeds (NEDO technical development organization, fuel batteries and hydrogen technical development department, electricity storage technical development division "NEDO secondary battery technical development roadmap 2013" (August 2013)). In all solid-state secondary batteries, particularly, inorganic solid electrolyte layers are members that are not included in liquid-type batteries or high-molecular-weight-type batteries, and development of inorganic solid electrolyte layers is highly expected. Solid electrolyte layers are generally molded by heating and pressurizing electrolyte materials applied to the solid electrolyte layers together with a binder and the like. In such a case, the joint state between the solid electrolyte layers is turned from point contact into surface contact, and grain boundary resistivity is decreased, whereby impedance can be decreased.

There are examples in which the particle diameters of inorganic solid electrolyte particles that are added to solid electrolyte layers and the like are appropriately adjusted in order to improve battery performance. For example, in WO2011/105574A, attempts are made to reduce coating unevenness or internal resistance by setting the average particle diameter and the 90% cumulative particle diameter of sulfide glass made up of $Li_2S$ and $P_2S_5$. In JP5445527B, dibutyl ether is added to a coarse material made up of $Li_2S$ and $P_2S_5$ and the mixture is milled, whereby it is possible to increase the collection ratio and maintain the ion conductivity.

SUMMARY OF THE INVENTION

The performance of all solid-state secondary batteries can be changed by adjusting the particle diameters of inorganic solid electrolyte particles or milling conditions. However, the techniques described in the respective documents described above cannot be said to be fully satisfactory, and there has been a demand for additional improvement. Particularly, as is clear from the above-described documents, hitherto, research and development regarding solid electrolytes that are applied to all solid-state secondary batteries has been focused on $Li_2S/P_2S_5$-based materials, and only a limited amount of knowledge has been accumulated regarding other oxide-based inorganic solid electrolytes and the like.

Therefore, an object of the present invention is to provide an all solid-state secondary battery capable of exhibiting an improved ion-conducting property regardless of troublesome manufacturing steps or special materials, inorganic solid electrolyte particles, a solid electrolyte composition, an electrode sheet for a battery, and a method for manufacturing an all solid-state secondary battery.

Bearing the above-described object in mind, the present inventors carried out studies for performance improvement regarding inorganic solid electrolyte particles from diverse angles with the main focus on manufacturing techniques. Particularly, attention was paid not only to sulfide-based electrolyte materials but also to oxide-based electrolyte materials which are expected to be actively developed in the future, and property changes and influences on battery performance were confirmed by means of material analyses or experiments. As a result, it was found that, when the milling conditions are optimized using the existing ball mill crusher, particles having even surfaces can be relatively easily obtained. It was also found that, when inorganic solid electrolyte particles having surfaces on which the unevenness is restricted to a specific range are applied as a constituent material of all solid-state secondary batteries, the ion conduction of all solid-state secondary batteries is improved at a meaningful level. The present invention has been completed on the basis of the above-described finding.

According to the present invention, the following means are provided.

[1] An all solid-state secondary battery comprising: a positive electrode active material layer; a negative electrode active material layer; and an inorganic solid electrolyte layer between the positive and negative electrode active material layers, in which inorganic solid electrolyte particles satisfying all of the following data A are included in at least any layer of the positive electrode active material layer, the negative electrode active material layer, or the inorganic solid electrolyte layer:

<data A>
a perimeter of a projected particle of the inorganic solid electrolyte particle is represented by L;
a cross-sectional area of the projected particle of the inorganic solid electrolyte particle is represented by A;
an unevenness coefficient FU represented by Expression (1) below is in a range of 0.85 or more and 1 or less;

$$FU = 4\pi A/L^2 \qquad (1).$$

[2] The all solid-state secondary battery according to [1], in which an average particle diameter of the inorganic solid electrolyte particles is 1 μm or more and 10 μm or less.

[3] The all solid-state secondary battery according to [1] or [2], in which D90 of the inorganic solid electrolyte particles is 2 μm or more and 20 μm or less.

[4] The all solid-state secondary battery according to any one of [1] to [3], in which a flatness ratio that is evaluated using Feret's diameter of the inorganic solid electrolyte particles is 1.2 or higher and 1.76 or lower.

[5] The all solid-state secondary battery according to any one of [1] to [4], in which thicknesses of the positive electrode active material layer, the negative electrode active material layer, and the inorganic solid electrolyte layer are respectively 1 μm or more and 1,000 μm or less.

[6] The all solid-state secondary battery according to any one of [1] to [5], in which at least one layer of the positive electrode active material layer, the negative electrode active material layer, or the inorganic solid electrolyte layer includes a binder.

[7] The all solid-state secondary battery according to any one of [1] to [6], in which the inorganic solid electrolyte particles are oxide-based inorganic solid electrolyte particles.

[8] The all solid-state secondary battery according to [7], in which the oxide-based inorganic solid electrolyte particles are selected from compounds of the following formulae:

$Li_{xa}La_{ya}TiO_3$
  xa=0.3 to 0.7, ya=0.3 to 0.7
$Li_7La_3Zr_2O_{12}$
$Li_{3.5}Zn_{0.25}GeO_4$
$LiTi_2P_3O_{12}$
$Li_{1+xb+yb}(Al, Ga)_{xb}(Ti, Ge)_{2-xb}Si_{yb}P_{3-yb}O_{12}$
  0≤xb≤0, 0≤yb≤1
$Li_3PO_4$
LiPON
LiPOD
  D is at least one selected from Ti, V, Cr, Mn, Fe, Co, Ni, Cu, Zr, Nb, Mo, Ru, Ag, Ta, W, Pt, or Au
LiAON
  A is at least one selected from Si, B, Ge, Al, C, or Ga.

[9] The all solid-state secondary battery according to any one of [1] to [6], in which the inorganic solid electrolyte particles are sulfide-based inorganic solid electrolyte particles.

[10] The all solid-state secondary battery according to any one of [1] to [9], in which, when the inorganic solid electrolyte particles are prepared by means of stirring and crushing in a crushing medium including crushing particles in a mixing tank in a crusher, an average particle diameter of the crushing particles is set to 100 times or more and 1,500 times or less the average particle diameter of target inorganic solid electrolyte particles, and a filling percentage of the crushing particles in the mixing tank is set to be higher than 60% and 74% or lower according to a definition of Expression (2) below:

$$\text{filling percentage } \alpha = \Sigma Z/V_0 \times 100 \qquad (2)$$

$V_0$: an inner volume of the mixing tank
$\Sigma Z$: a sum of volumes of the crushing particles filling the mixing tank.

[11] The all solid-state secondary battery according to [10], in which the crushing particles include at least one material selected from agate, alumina, zirconia, stainless steel, chromium steel, tungsten carbide, or silicon nitride.

[12] A method for manufacturing inorganic solid electrolyte particles, comprising: a step of preparing a raw material of the inorganic solid electrolyte particles; a step of feeding the raw material of the inorganic solid electrolyte particles, crushing particles, and a crushing medium into a mixing tank of a crusher; and a step of stirring the raw material of the inorganic solid electrolyte particles, the crushing particles, and the crushing medium in the mixing tank, in which a filling percentage of the crushing particles in the mixing tank is set to be higher than 60% and 74% or lower according to a definition of Expression (2) below:

$$\text{filling percentage } \alpha = \Sigma Z/V_0 \times 100 \qquad (2)$$

$V_0$: an inner volume of the mixing tank
$\Sigma Z$: a sum of volumes of the crushing particles filling the mixing tank.

[13] The method for manufacturing inorganic solid electrolyte particles according to [12], in which an average particle diameter of the crushing particles is set to 100 times or more and 1,500 times or less the average particle diameter of target inorganic solid electrolyte particles.

[14] The all solid-state secondary battery according to [9], in which, when the sulfide-based inorganic solid electrolyte particles are prepared by means of stirring and crushing in a crushing medium including crushing particles in a mixing tank in a crusher, an average particle diameter of the crushing particles is set to 1,000 times or more and 10,000 times or less the average particle diameter of target inorganic solid electrolyte particles, and a density of the crushing particles is set to 0.9 g/cm³ or more and 2.4 g/cm³ or less.

[15] The all solid-state secondary battery according to [14], in which the crushing particles include at least one selected from thermosetting plastic particles, thermoplastic plastic particles, or rubber particles.

[16] A method for manufacturing inorganic solid electrolyte particles, comprising: a step of preparing a sulfide-based electrolyte as a raw material of the inorganic solid electrolyte particles; a step of feeding the raw material of the inorganic solid electrolyte particles, crushing particles, and a crushing medium into a mixing tank of a crusher; and a step of stirring the raw material of the inorganic solid electrolyte particles, the crushing particles, and the crushing medium in the mixing tank, in which a density of the crushing particles is set to 0.9 g/cm³ or more and 2.4 g/cm³ or less.

[17] The method for manufacturing inorganic solid electrolyte particles according to [16], in which an average particle diameter of the crushing particles is set to 1,000 times or more and 10,000 times or less the average particle diameter of target inorganic solid electrolyte particles.

[18] A method for manufacturing a solid electrolyte composition, comprising: preparing a composition of inorganic solid electrolyte particles which is used for all solid-state secondary batteries using the method for manufacturing inorganic solid electrolyte particles according to any one of [12], [13], [16], and [17].

[19] A method for manufacturing an electrode sheet for a battery, comprising: a step of imparting a solid electrolyte composition obtained using the manufacturing method according to [18] onto a metal foil.

[20] A method for manufacturing an all solid-state secondary battery, comprising: manufacturing the all solid-state secondary battery using the method for manufacturing an electrode sheet for a battery according to [19].

In the present specification, numerical ranges expressed using "to" include numerical values before and after the "to" as the lower limit value and the upper limit value.

The all solid-state secondary battery of the present invention can be manufactured regardless of troublesome manufacturing steps or special materials and exhibits an improved ion-conducting property. In addition, according to the solid electrolyte composition, the electrode sheet for a battery, and the method for manufacturing an all solid-state secondary battery of the present invention, it is possible to preferably manufacture all solid-state secondary batteries having the above-described excellent performance.

The above-described and other characteristics and advantages of the present invention will become more evident from the following description with appropriate reference to the accompanying drawings.

DESCRIPTION OF THE PREFERRED EMBODIMENTS

Hereinafter, the present invention will be described in detail. In some cases, constituent requirements described below will be described on the basis of typical embodiments or specific examples, but the present invention is not limited to such embodiments. An all solid-state secondary battery of the present invention includes inorganic solid electrolyte particles having a specific unevenness coefficient as a constituent material. Here, a preferred embodiment thereof will be described, and, first, an example of an all solid-state secondary battery which is a preferred application form will be described.

<All Solid-State Secondary Battery>

Figure 1:
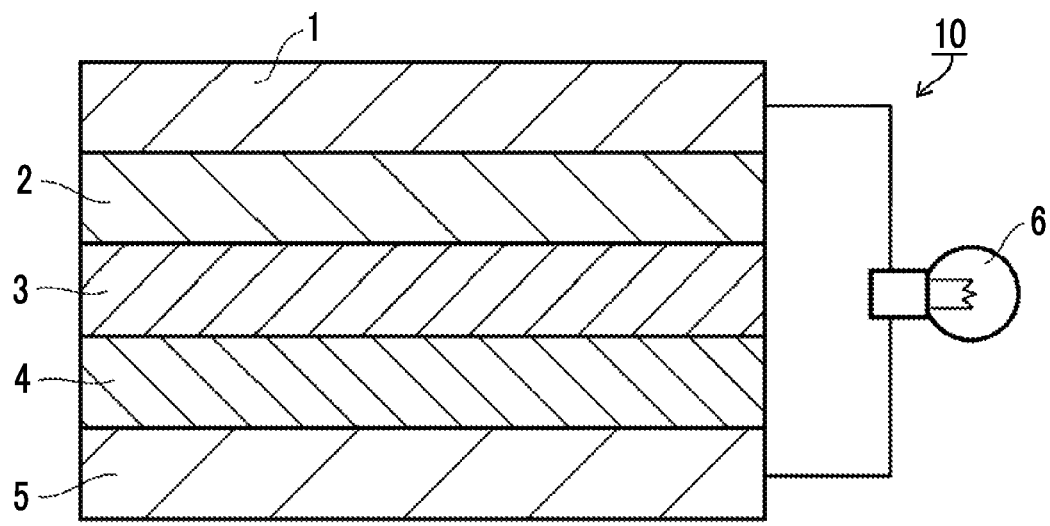
FIG. 1 is a vertical cross-sectional view illustrating a schematic all solid-state lithium ion secondary battery according to a preferred embodiment of the present invention.

FIG. 1 is a vertical cross-sectional view schematically illustrating an all solid-state secondary battery (lithium ion secondary battery) according to a preferred embodiment of the present invention. An all solid-state secondary battery 10 of the present embodiment has a negative electrode collector 1, a negative electrode active material layer 2, an inorganic solid electrolyte layer 3, a positive electrode active material layer 4, and a positive electrode collector 5 in this order from the negative electrode side. The respective layers are in contact with each other and have a laminated structure. Since the above-described structure is employed, during charging, electrons (e$^-$) are supplied to the negative electrode side, and lithium ions (Li$^+$) are stored on the negative electrode side. On the other hand, during discharging, the lithium ions (Li$^+$) accumulated in the negative electrode return to the positive electrode side, and electrons are supplied to an operation section 6. In the example illustrated in the drawing, an electric bulb is employed as the operation section 6 and is turned on by means of discharging. In the present invention, a solid electrolyte composition is preferably used as a constituent material of the negative electrode active material layer, the positive electrode active material layer, and the inorganic solid electrolyte layer and, furthermore, preferably used as a constituent material of all of the inorganic solid electrolyte layer, the positive electrode active material layer, and the negative electrode active material layer. Meanwhile, in some cases, the positive electrode active material layer and the negative electrode active material layer will be collectively referred to as the active material layers. In addition, as electrode active materials that are used in the present invention, there are a positive electrode active material that is included in the positive electrode active material layer and a negative electrode active material that is included in the negative electrode active material layer, and there are cases in which either or both electrode active materials will be simply referred to as active materials or electrode active materials.

The thicknesses of the positive electrode active material layer 4 and the negative electrode active material layer 2 can be determined depending on the intended battery capacity. When the dimensions of ordinary elements are taken into account, the thicknesses are preferably 1 μm or more, more preferably 1.5 μm or more, still more preferably 3 μm or more, and particularly preferably 5 μm or more. The upper limit thereof is preferably 1,000 μm or less, more preferably 600 μm or less, still more preferably 400 μm or less, and particularly preferably 200 μm or less.

On the other hand, the inorganic solid electrolyte layer 3 is desirably as thin as possible while preventing short-circuiting between the positive electrode and the negative electrode. Furthermore, the effects of the present invention are preferably significantly developed, and, specifically, the thickness of the inorganic solid electrolyte layer is preferably 1 μm or more, more preferably 1.5 μm or more, still more preferably 3 μm or more, and particularly preferably 5 μm or more. The upper limit thereof is preferably 1,000 μm or less, more preferably 600 μm or less, still more preferably 400 μm or less, and particularly preferably 200 μm or less.

In FIG. 1, as described above, a laminate made up of the collectors, the active material layers, and the solid electrolyte layer is referred to as the "all solid-state secondary battery"; however, in the production of batteries, all solid-state secondary batteries (for example, coin batteries, laminate batteries, and the like) may be produced by storing this laminate as an electrode sheet for a secondary battery in a chassis (case).

Meanwhile, between the respective layers of the negative electrode collector 1, the negative electrode active material layer 2, the inorganic solid electrolyte layer 3, the positive electrode active material layer 4, and the positive electrode collector 5 or on the outside thereof, polyfunctional layers may be appropriated interposed or provided. In addition, the respective layers may be constituted of a single layer or multiple layers.

In the all solid-state secondary battery of the present invention, inorganic solid electrolyte particles satisfying all of the following data A are included in at least any layer of the positive electrode active material layer, the negative electrode active material layer, or the inorganic solid electrolyte layer.

<Data A>
- a perimeter of a projected particle of the inorganic solid electrolyte particle is represented by L;
- a cross-sectional area of the projected particle of the inorganic solid electrolyte particle is represented by A;
- an unevenness coefficient FU represented by Expression (1) below is in a range of 0.85 or more and 1 or less;

$$FU = 4\pi A/L^2 \quad (1)$$

As is clear from the expression, the unevenness coefficient FU indicates the degree of unevenness on the surface of a particle. As the value approximates to 1, unevenness diminishes (decreases), and, when the value is smaller than 1, unevenness intensifies (increases). In addition, this unevenness coefficient FU also has a property of serving as an index of the overall shape of the particle, and, as the particle becomes more truly spherical and the projected particle becomes rounder, the value approximates to 1. Inversely, as the shape of the particle becomes more elliptical, the value decreases.

Figure 2:
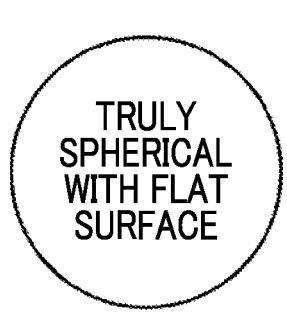
FIG. 2 is an explanatory view schematically illustrating forms of particles in order to explain the meaning of an unevenness coefficient.
Figure 2:
Figure 2:
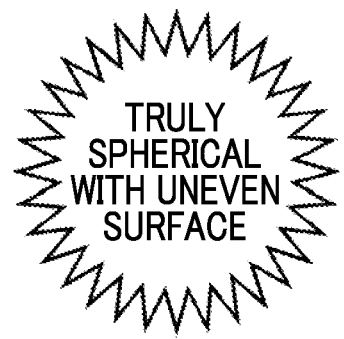

FIG. 2 schematically illustrates what has been described above. The left-side circle in FIG. 2 is truly spherical. This circle does not include any protrusions and recesses and draws a continuous circle. In such a case, FU reaches "1". In contrast, when the particle has an elliptical shape like the circle in the middle of FIG. 2, the particle does not have protrusions and recesses on the surface, but FU is below "1". The right-side diagram has a truly spherical base, but there are significant protrusions and recesses on the surface. In such a case, the particle is truly spherical, but FU is below "1". The influence of changes between truly spherical shapes and elliptical shapes on the FU value and the influence of surface unevenness are both dependent on the degrees thereof; however, generally, the influence of surface unevenness more significantly changes the FU value.

In the present invention, the FU value is 0.85 or higher, preferably 0.88 or higher, and more preferably 0.9 or higher. The upper limit of the FU value is 1 or lower, preferably 0.99 or lower, and more preferably 0.98 or lower. When the FU value is set in the above-described range, higher ion conductivity is exhibited in the constituent layers of all solid-state secondary batteries, which is preferable.

Figure 3:
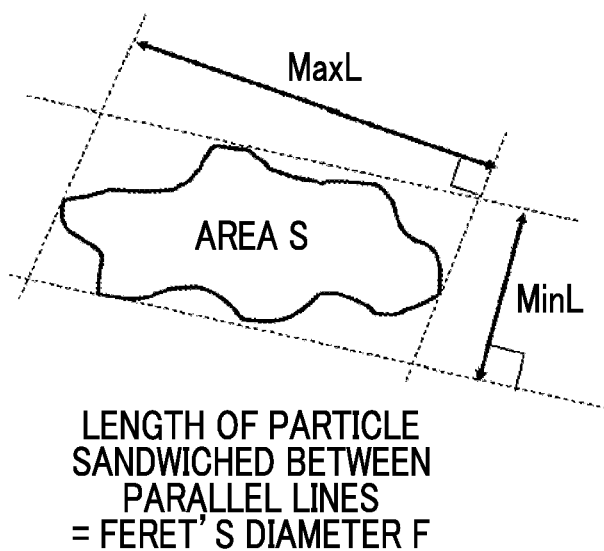
FIG. 3 is an explanatory view schematically illustrating forms of particles in order to explain the meaning of Feret's diameter.

In the present invention, the setting of the projected shapes of particles to be truly spherical or elliptical is not an item that needs to be essentially adjusted, but the projected shapes are preferably more truly spherical from the viewpoint of exhibiting better performance. As an index indicating the degree of being truly spherical, for example, Feret's diameter F described below can be used [refer to accompanying FIG. 3] (refer to "Techniques for measuring dispersibility and measurement instruments", p. 525, Vol. 56, Issue 8 (1983), Journal of the Society of Rubber Science and Technology).

Feret's diameter F: When the length of a particle sandwiched between parallel lines in a certain direction is represented by FH,
the length of the particle at which Feret's diameter F is maximized is represented by MaxL,
the length of the particle at which Feret's diameter F is minimized is represented by MinL,
the above-described long axis is represented by MaxL, and the short axis is represented by MinL, the flatness ratio (MaxL/MinL) [f1] is preferably 2 or lower, more preferably 1.8 or lower, more preferably 1.76 or lower, more preferably 1.75 or lower, and particularly preferably 1.74 or lower. The lower limit value thereof is realistically higher than 1 and more realistically 1.2 or higher.

The average particle diameter (df) of the inorganic solid electrolyte particles is preferably 0.5 μm or more, more preferably 1 μm or more, still more preferably 1.5 μm or more, and particularly preferably 2 μm or more. The upper limit thereof is preferably 100 μm or less, more preferably 20 μm or less, still more preferably 10 μm or less, still more preferably 9.5 μm or less, and particularly preferably 9 μm or less.

The maximum particle diameter (dfm) of the inorganic solid electrolyte particles is preferably 1 μm or more, more preferably 1.5 μm or more, and particularly preferably 2 μm or more. The upper limit thereof is preferably 500 μm or less, more preferably 100 μm or less, still more preferably 80 μm or less, still more preferably 70 μm or less, and particularly preferably 60 μm or less.

D90 of the inorganic solid electrolyte particles is preferably 1 μm or more, more preferably 1.5 μm or more, and particularly preferably 2 μm or more. The upper limit thereof is preferably 300 μm or less, more preferably 100 μm or less, still more preferably 80 μm or less, still more preferably 70 μm or less, still more preferably 60 μm or less, still more preferably 40 μm or less, and particularly preferably 20 μm or less.

In the present invention, when the data regarding the particle diameters of the inorganic solid electrolyte particles is set in the above-described range, the effect of setting the unevenness coefficient of the particles in a specific range become more significant, which is preferable. Meanwhile, as the average particle diameter of the inorganic solid electrolyte particles, an average particle diameter obtained by means of arithmetic averaging on the basis of volumes is used. As the maximum particle diameter of the inorganic solid electrolyte particles, the maximum particle diameter (μm) in the particle size distribution obtained by means of measurement using a particle size distribution analyzer MT3000 manufactured by Nikkiso Co., Ltd. is used. D90 refers to the particle diameter at a point at which, when the particle diameters are depicted by a % cumulative distribution curve, the % cumulative distribution curve intersects a point of 90% in the horizontal axis.

In the present specification, numerical values regarding particle diameters are obtained by means of measured under conditions described in the following examples unless particularly otherwise described.

<Crushing Method>

In the present invention, the inorganic solid electrolyte particles may be manufactured using any method as long as the data A can be achieved. Examples of a preferred preparation method include a variety of crushing treatments.

Meanwhile, the method for manufacturing the inorganic solid electrolyte particles in the present invention preferably includes (a) step of preparing a raw material of the inorganic solid electrolyte particles, (b) step of feeding the raw material of the inorganic solid electrolyte particles, crushing particles, and a crushing medium into a mixing tank of a crusher, and (c) step of stirring the raw material of the inorganic solid electrolyte particles, the crushing particles, and the crushing medium in the mixing tank.

Crushing Treatment

Examples of a method for the crushing treatment include media-type crushing such as beads milling and planetary ball milling, jet crushing, cavitation crushing, and the like. Crushing conditions are preferably set so that coarse materials can be crushed to desired particle diameters. For example, in a case in which a media-type crusher such as a planetary ball mill is used, a raw material (a coarse material) of the inorganic solid electrolyte particles, a crushing medium, and crushing particles (crushing balls) are added thereto, and the treatment is carried out at a desired rotation speed for a desired time.

Crushing Particles

As the crushing particles that are used in the present invention, crushing particles that are used for (i) crushing at a specific filling percentage and (ii) crushing with low-density crushing particles will be described as typical examples. Any crushing conditions of the crushing particles are also preferably applied to prepare the inorganic solid electrolyte particles by means of stirring and crushing in a crushing medium including the crushing particles in a mixing tank in a crusher.

(i) Crushing at a Specific Filling Percentage

The average particle diameter ($\varphi$) of the crushing particles is, for example, preferably 0.05 mm or more, more preferably 0.1 mm or more, still more preferably 0.3 mm or more, and particularly preferably 0.5 mm or more. The upper limit thereof is preferably 10 mm or less, more preferably 8 mm or less, and particularly preferably 5 mm or less.

The average particle diameter ($\varphi$) of the crushing particles is also preferably set in consideration of the correlation with the average particle diameter (df) of the target inorganic solid electrolyte particles. For example, the average particle diameter ($\varphi$) of the crushing particles is preferably set to 2,500 times or less, more preferably set to 2,200 times or less, still more preferably set to 1,900 times or less, still more preferably set to 1,500 times or less, and particularly preferably set to 1,300 times or less the average particle diameter (df) of the target inorganic solid electrolyte particles. The lower limit thereof is preferably set to 100 times or more, more preferably set to 200 times or more, and particularly preferably set to 300 times or more.

The ratio ($\varphi$/di) between the average particle diameter ($\varphi$) of the crushing particles and the average particle diameter (di) of the inorganic solid electrolyte particles which serve as a raw material is preferably set to 1,500 or less, more preferably set to 1,000 or less, still more preferably set to 980 or less, still more preferably set to 960 or less, and particularly preferably set to 940 or less. The lower limit thereof is preferably set to 100 or more, more preferably set to 200 or more, and particularly preferably set to 300 or more.

When the particle diameter of the crushing particles is set in the above-described range, it is possible to more effectively prepare inorganic solid electrolyte particles having an unevenness coefficient FU in a specific range, which is preferable.

Here, the target inorganic solid electrolyte particles are inorganic solid electrolyte particles satisfying all of the data A and refer to, in a case in which the crushing treatment is carried out, inorganic solid electrolyte particles that have been subjected to the crushing treatment.

The material of the crushing particles is not particularly limited, and examples of commercially available crushing particles include particles made of agate (2.65), alumina (3.8), zirconia (5.7), stainless steel (7.8), chromium steel (7.9), tungsten carbide (14.7), or silicon nitride (3.1), which are preferable. Numerical values in parentheses are examples of the density (g/cm$^3$) on catalogs. The density of the crushing particles is not particularly limited, but the crushing particles having a density of 3 g/cm$^3$ or more are preferably applied, the crushing particles having a density of 4 g/cm$^3$ or more are more preferably applied, and the crushing particles having a density of 5 g/cm$^3$ or more are particularly preferably applied in consideration of the crushing efficiency and the procuring property. The upper limit thereof is realistically 10 g/cm$^3$ or less.

One kind of the crushing particles may be used singly or two or more kinds of the crushing particles may be used in a mixed form.

In the present invention, the amount of the crushing particles in the container is preferably set in a specific range. Particularly, in order to set the unevenness coefficient in the above-described range, the filling percentage (a) defined by Expression (2) below is preferably set to more than 60%, more preferably set to 61% or more, still more preferably set to 62% or more, and particularly preferably set to 64% or more of the inner volume ($V_0$) of a crushing tank for the crushing particles. The upper limit thereof is not particularly limited; however, when the crushing particles are considered to have a truly spherical shape, the upper limit reaches 74% even when the container is fully filled with the crushing particles. Therefore, the filling percentage (a) is realistically 74% or less.

$$\text{filling percentage } \alpha = \Sigma Z/V_0 \times 100 \quad (2)$$

$V_0$: an inner volume of the mixing tank $\Sigma Z$: a sum of volumes of the crushing particles filling the mixing tank (ii) Crushing with Low-Density Crushing Particles The average particle diameter (4) of the crushing particles is, for example, preferably 0.05 mm or more, more preferably 0.1 mm or more, still more preferably 0.3 mm or more, and particularly preferably 0.5 mm or more. The upper limit thereof is preferably 10 mm or less, more preferably 8 mm or less, and particularly preferably 5 mm or less.

The average particle diameter (4) of the crushing particles is also preferably set in consideration of the correlation with the average particle diameter (df) of the target inorganic solid electrolyte particles. For example, the average particle diameter (4) of the crushing particles is preferably set to 10,000 times or less, more preferably set to 5,100 times or less, still more preferably set to 4,800 times or less, still more preferably set to 4,500 times or less, still more preferably set to 4,200 times or less, and particularly preferably set to 3,900 times or less the average particle diameter (df) of the target inorganic solid electrolyte particles. The lower limit thereof is preferably set to 100 times or more, more preferably set to 200 times or more, still more preferably set to 300 times or more, and particularly preferably set to 1,000 times or more.

The ratio (4)/di) between the average particle diameter (4)) of the crushing particles and the average particle diameter (di) of the inorganic solid electrolyte particles which serve as a raw material is preferably set to 10,000 or less, more preferably set to 5,100 or less, still more preferably set to 4,800 or less, still more preferably set to 4,500 or less, still more preferably set to 4,200 or less, and particularly preferably set to 3,900 or less. The lower limit thereof is preferably set to 100 or more, more preferably set to 200 or more, still more preferably set to 300 or more, and particularly preferably set to 1,000 or more.

When the particle diameter of the crushing particles is set in the above-described range, it is possible to more effectively prepare inorganic solid electrolyte particles having an unevenness coefficient FU in a specific range, which is preferable.

In the present invention, low-density crushing particles are preferably applied. The low-density crushing particles having a density of 0.9 g/cm$^3$ or more are preferably applied, the low-density crushing particles having a density of 1.0 g/cm$^3$ or more are more preferably applied, and the crushing particles having a density of 1.1 g/cm$^3$ or more are particularly preferably applied in consideration of the crushing efficiency and the procuring property. As the upper limit thereof, the low-density crushing particles having a density of 2.4 g/cm$^3$ or less are preferably applied, the low-density crushing particles having a density of 2.3 g/cm$^3$ or less are more preferably applied, and the crushing particles having a density of 2.2 g/cm$^3$ or less are particularly preferably applied.

The material of the crushing particles is not particularly limited, and, for example, resin particles can be used.

In a case in which resin particles are used, it is possible to set the unevenness coefficient in the range of the present invention without adjusting the filling percentage.

Preferred examples of the resin particles include thermosetting plastic particles, thermoplastic plastic particles, and rubber particles.

As the thermosetting plastic particles, phenolic resin particles, urea resin particles, melamine resin particles, unsaturated polyester resin particles, diallyl phthalate resin particles, epoxy resin particles, polyurethane particles, or the like can be used.

As the thermoplastic plastic particles, versatile plastic particles, engineer plastic particles, or super engineering plastic particles can be used.

As the versatile plastic particles, polyethylene particles, high-density polyethylene particles, middle-density polyethylene particles, low-density polyethylene particles, polypropylene particles (0.91), polystyrene particles, ABS resin particles, acrylic resin particles, polyvinyl chloride particles, or the like can be used.

As the engineer plastic particles, polyamide (nylon) particles (1.14), polyacetal particles, polycarbonate particles, polybutylene terephthalate particles, polyethylene terephthalate particles, polyphenylene ether particles, and the like can be used.

As the super engineering plastic particles, polyimide (VESPEL) particles, polyamide-imide particles, polyetherimide particles, polyether sulfone particles, polysulfone particles, polyether ether ketone particles, polyphenylenen sulfide particles, polymethylpentene particles, polytetrafluoroethylene (2.17) particles, or the like can be used.

Meanwhile, numerical values in parentheses are examples of the density (g/cm$^3$) on catalogs.

As the rubber particles, natural rubber particles, nitrile rubber particles, ethylene propylene rubber particles, urethane rubber particles, silicone rubber particles, fluorine rubber particles, chloroprene rubber particles, neoprene rubber particles, styrene rubber particles, butyl rubber particles, polysulfide rubber particles, and the like can be used.

In addition, these particles do not need to be particles made of a single material, and complexed particles such as iron-cored resin particles can also be used. In addition, one kind of the particles may be used singly, or two or more kinds of the particles may be used in a mixed form.

In the present invention, the filling percentage (a) defined by Expression (2) may be low. Specifically, the filling percentage is preferably set to 65% or less, more preferably set to 60% or less, still more preferably set to 45% or less, and particularly preferably set to 30% or less. The lower limit is not particularly limited, but is realistically 10% or more from the viewpoint of the crushing efficiency or the economic efficiency.

In the present invention, in the crushing at a specific filling percentage (i), an oxide-based inorganic solid electrolyte is preferably applied since the oxide-based inorganic solid electrolyte has a high particle hardness and is not easily crushed, and, in the crushing with low-density crushing particles (ii), a sulfide-based inorganic solid electrolyte is preferably applied since the sulfide-based inorganic solid electrolyte has a low particle hardness and is easily crushed.

Crusher

Figure 4:
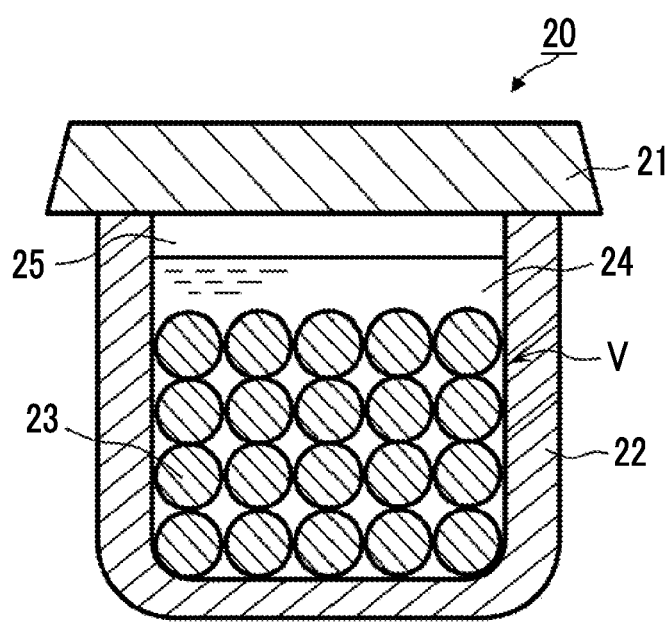
FIG. 4 is a vertical cross-sectional view schematically illustrating a crusher according to a preferred embodiment of the present invention.

FIG. 4 is a vertical cross-sectional view schematically illustrating a crusher (crushing tank) that is preferably applied in the present invention. In the form illustrated in the same drawing, a liquid mixture 24 obtained by mixing crushing particles 23 and a raw material (coarse material) of the inorganic solid electrolyte particles (not illustrated) into a crushing medium is put into a container 22. In the present embodiment, a crushing tank V is set to maintain a space 25. The container 22 can be sealed with a lid 21. In this crusher 20, a rotary operation section (not illustrated) is installed, and the container 22 is mounted on the rotary operation section. The container 22 is rotated and revolved by operating the rotary operation section, whereby the coarse material in the container can be crushed.

Figure 5:
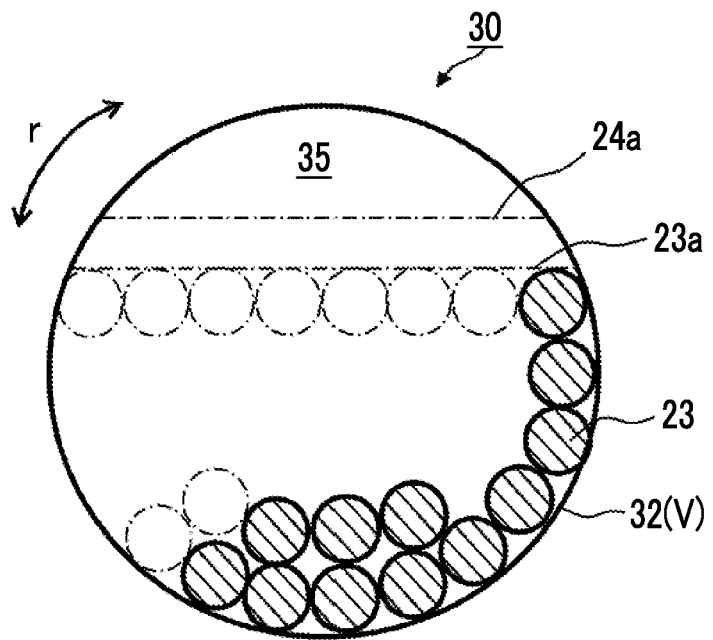
FIG. 5 is a vertical cross-sectional view schematically illustrating a crusher according to another preferred embodiment of the present invention.

FIG. 5 is a vertical cross-sectional view schematically illustrating another crusher (crushing tank) that is preferably applied in the present invention. In the present embodiment, a liquid mixture obtained by mixing the crushing particles 23 and the raw material (coarse material) of the inorganic solid electrolyte particles (not illustrated) into a crushing medium is put into a container 32 (in the same drawing, the thickness of the container is not illustrated, and the container is drawn in the same form as the crushing tank V). In the drawing, part of the crushing particles 23 are not illustrated, which means that the crushing particles 23 are fed so as to reach the broken line indicating the filling location 23a of the crushing particles. The liquid mixture is fed so as to reach the broken line indicating a filling location 24a of the liquid mixture, and the remaining part forms a space 35. The container in a crusher 30 has an overturned cylindrical shape, and a rotary operation section (not illustrated) is installed at either or both ends thereof. The container 32 is rotated by operating the rotary operation section, whereby the coarse material in the container can be crushed.

Meanwhile, in ordinary settings, the filling percentage (a) of the crushing particles is set to 20% to 40%. For example, in the homepages of the following crusher makers, the filling percentage of approximately 30% is recommended.

Fritsch Japan Co., Ltd. http://www.fritsch.co.jp/premium-linep-7. html

ASADA Iron Works Co., Ltd.
http//www.asadatekko.co.jp/products/mill/ballmill.html Additionally, in Example 1 in the specification of JP5445527B, zirconia beads (40 g) are applied to a 45 mL container, and the filling percentage (a) is estimated to be approximately 10 to 20%.

The inner volume ($V_0$) of the crushing tank in the crusher is not particularly limited and may be appropriately set depending on the production amount. The inner volume ($V_0$) is preferably set to 10 cm³ or more, more preferably set to 11 cm³ or more, and particularly preferably set to 12 cm³ or more in consideration of the production efficiency, the production of inorganic solid electrolyte particles having a specific unevenness coefficient FU, the setting of commercially available apparatuses, or the like. The upper limit thereof is preferably set to 2,000 cm³ or less, more preferably set to 1,500 cm³ or less, and particularly preferably set to 1,000 cm³ or less.

Coarse Material

The shape of the raw material (coarse material) of the inorganic solid electrolyte particles can be, for example, a granular shape. The average particle diameter (di) of the coarse material is, for example, preferably 1 μm or more and more preferably 1.5 μm or more. The upper limit is not particularly limited, but is preferably 20 μm or less and more preferably 10 μm or less. The maximum particle diameter (dim) of the coarse material is preferably 1 μm or more, more preferably 1.5 μm or more, and particularly preferably 2 μm or more. The upper limit is preferably 500 μm or less, more preferably 200 μm or less, still more preferably 100 μm or less, and particularly preferably 80 μm or less. Alternatively, the coarse material may not have a granular shape.

Crushing Medium

As the crushing medium, a variety of solvents may be added. When wet-type crushing is carried out using a crushing medium, granulation of the electrolyte material during crushing and attachment to the media can be prevented. As a specific example thereof, the media exemplified in the section of dispersion media described below can be used. Among these, aliphatic compound solvents such as heptane, hexane, and octane, aromatic compound catalysts such as benzene, toluene, and xylene, and the like are preferred. Meanwhile, the amount of the crushing medium added is not particularly limited, but is preferably adjusted so that the target inorganic solid electrolyte particles can be obtained. Specifically, the concentration of the inorganic solid electrolyte particles is realistically in a range of 1% to 50% by mass.

Rotation Speed and the Like

When media-type crushing is carried out using a planetary ball mill or the like, the table rotation speed is, for example, preferably in a range of 100 rpm to 500 rpm and more preferably in a range of 150 rpm to 400 rpm. The treatment time is, for example, preferably in a range of 0.5 hours to 5 hours and more preferably in a range of 1 hour to 4 hours.

Other Steps

After the crushing step, a drying treatment for removing the crushing medium may be carried out. Therefore, only the inorganic solid electrolyte particles can be separated and removed, and the crushing medium can be switched to a dispersion medium suitable for battery performance. The drying temperature is not particularly limited and can be appropriately set in consideration of the influence on the inorganic solid electrolyte particles. After the crushing step, the pulverized material may be fired or glassified by being heated at a high temperature. Meanwhile, in a case in which the drying treatment is not carried out, the crushing medium can also be used more or as a coating solvent.

As a specific crusher, commercially available crushers can be used without any limitations. Specific examples thereof include Micro mill Pulverisette 7 (classic line) manufactured by Fritsch Japan Co., Ltd., ball mill 300L-SBM, 600L-SBM, 1000L-SBM, 2000L-SBM, 3000L-SBM, 6000L-SBM, 300L-PBM, 600L-PBM, 1000L-PBM, 2000L-PBM, 3000L-PBM, 6000L-PBM (all trade names) manufactured by ASADA Iron Works Co., Ltd., and the like.

Meanwhile, the method for manufacturing particles having an unevenness coefficient (FU) approximating to 1 is not limited to the above-described method, and examples thereof include use of a build-up method, adjustment of drying (solvent scattering) conditions, and the like.

Hereinafter, a solid electrolyte composition that can be preferably used to manufacture the all solid-state secondary battery of the present invention will be described.

<Solid Electrolyte Composition>

(Inorganic Solid Electrolyte)

The inorganic electrolyte refers to a solid electrolyte of an inorganic substance. In the present specification, solid electrolytes refer to solid-form electrolytes capable of migrating ions in the electrolytes. From this viewpoint, in some cases, inorganic solid electrolytes will be referred to as ion conductive inorganic solid electrolytes in order to differentiate the inorganic solid electrolytes from electrolyte salts described below (supporting electrolytes). The ion conductivity of the inorganic solid electrolyte is not particularly limited, but is preferably $1\times10^{-6}$ S/cm or higher, more preferably $1\times10^{-5}$ S/cm or higher, still more preferably $1\times10^{-4}$ S/cm or higher, and particularly preferably $1\times10^{-3}$ S/cm or higher for lithium ions. The upper limit thereof is not particularly limited, but is realistically 1 S/cm or lower. Unless particularly otherwise described, the ion conductivity is measured under the conditions described in the following examples.

The inorganic solid electrolyte does not include any organic substances such as high-molecular-weight compounds or complexes as electrolytes and are thus clearly differentiated from organic solid electrolytes (high-molecular-weight electrolytes represented by PEO and the like and organic electrolyte salts represented by LiTFSI). In addition, the inorganic solid electrolyte is a non-dissociative solid in a normal state and is thus not dissociated or liberated into cations and anions. Due to this point, the inorganic solid electrolyte is also clearly differentiated from inorganic electrolyte salts from which cations and anions are dissociated or liberated in electrolytic solutions or polymers ($LiPF_6$, $LiBF_4$, LiFSI, LiCl, and the like). Generally, the inorganic solid electrolyte has a property of conducting ions of a metal (preferably lithium ions) belonging to Group I or II of the periodic table, but does not have an electron-conducting property.

In the present invention, the inorganic solid electrolyte having a property of conducting ions of a metal (preferably lithium ions) belonging to Group I or II of the periodic table is added to the electrolyte layer or the active material layers. For the inorganic solid electrolyte, it is possible to appropriately select and use a solid electrolyte material that is applied to this kind of products. Representative examples of the inorganic solid electrolyte include (i) sulfide-based inorganic solid electrolytes and (ii) oxide-based inorganic solid electrolytes.

(i) Sulfide-Based Inorganic Solid Electrolyte

The sulfide-based inorganic solid electrolyte preferably contains sulfur (S), has a property of conducting ions of a metal belonging to Group I or II of the periodic table, and has an electron-insulating property. Examples thereof include lithium ion-conductive inorganic solid electrolytes satisfying a composition represented by Formula (3) below.

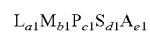  (3)

(In the formula, L represents an element selected from Li, Na, and K and is preferably Li. M represents an element selected from B, Zn, Sn, Si, Cu, Ga, Sb, Al, and Ge. Among these, B, Sn, Si, Al, and Ge are preferred, and Sn, Al, and Ge are more preferred. A represents I, Br, Cl, or F and is preferably I or Br and particularly preferably I. a1 to e1 represent the compositional ratios of the respective elements, and a1:b1:c1:d1:e1 satisfies 1 to 12:0 to 1:1:2 to 12:0 to 5. Furthermore, a1 is preferably 1 to 9 and more preferably 1.5 to 4. b1 is preferably 0 to 0.5. Furthermore, d1 is preferably 3 to 7 and more preferably 3.25 to 4.5. Furthermore, e1 is preferably 0 to 3 and more preferably 0 to 1.)

In Formula (3), regarding the compositional ratio of L, M, P, S, and A, it is preferable that b1 and e1 are zero, it is more preferable that b1 and e1 are zero and the proportions (a1:c1:d1) of a1, c1, and d1 are 1 to 9:1:3 to 7, and it is still more preferable that b1 and e1 are zero and a1:c1:d1 are 1.5 to 4:1:3.25 to 4.5. The compositional ratio of the respective elements can be controlled by adjusting the amount of a raw material compound blended to manufacture the sulfide-based inorganic solid electrolyte as described below.

The sulfide-based inorganic solid electrolyte may be amorphous (glassy) or crystalline (glassy ceramic) or may be only partially crystalline. For example, it is possible to use Li—P—S-based glass containing Li, P, and S or Li—P—S-based glass ceramics containing Li, P, and S.

In the Li—P—S-based glass and the Li—P—S-based glass ceramics, the proportions of $Li_2S$ and $P_2S_5$ are preferably 65:35 to 85:15 and more preferably 68:32 to 75:25 in terms of the molar ratio between $Li_2S$ and $P_2S_5$. When the proportions of $Li_2S$ and $P_2S_5$ are set in the above-described range, it is possible to provide a high lithium ion conductivity. Specifically, it is possible to preferably set the lithium ion conductivity to $1 \times 10^{-4}$ S/cm or higher and more preferably set the lithium ion conductivity to $1 \times 10^{-3}$ S/cm or higher.

Specific examples of the compound include compounds obtained using a raw material composition containing, for example, $Li_2S$ and a sulfide of an element of Groups XIII to XV. Specific examples thereof include $Li_2S$—$P_2S_5$, $Li_2S$—$GeS_2$, $Li_2S$—$GeS_2$—ZnS, $Li_2S$—$Ga_2S_3$, $Li_2S$—$GeS_2$-$Ga_2S_3$, $Li_2S$—$GeS_2$—$P_2S_5$, $Li_2S$—$GeS_2$—$S_2$—$S_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—LiI, $Li_2S$—$SiS_2$—$Li_4SiO_4$, $Li_2S$—$SiS_2Li_3PO_4$, $Li_{10}GeP_2S_{12}$, and the like. Among these, crystalline and/or amorphous raw material compositions made of $Li_2S$—$P_2S_5$, $Li_2S$—$GeS_2$—$Ga_2S_3$, $Li_2SGeS_2$—$P_2S_5$, $Li_2S$—$SiS_2$—$P_2S_5$, $Li_2S$—$SiS_2$—$Li_4SiO_4$, or $Li_2S$—$SiS_2$—$Li_3PO_4$ have a favorable property of conducting lithium ions, which is preferable. Examples of a method for synthesizing a sulfide-based inorganic solid electrolyte material using the above-described raw material composition include an amorphization method. Examples of the amorphization method include a mechanical milling method and a melting and quenching method, and, among these, the mechanical milling method is preferred since treatments become possible at normal temperature, and manufacturing steps can be simplified.

(ii) Oxide-Based Inorganic Solid Electrolyte

The oxide-based solid electrolyte contains oxygen (O), has a property of conducting ions of a metal belonging to Group I or II of the periodic table, and preferably has an electron-insulating property.

Specific examples of the compound include $Li_{xa}La_{ya}TiO_3$ [xa=0.3 to 0.7 and ya=0.3 to 0.7] (LLT), $Li_7La_3Zr_2O_{12}$ (LLZ), $Li_{3.5}Zn_{0.25}GeO_4$ having a lithium super ionic conductor (LISICON)-type crystal structure, $LiTi_2P_3O_{12}$ having a natrium super ionic conductor (NASICON)-type crystal structure, $Li_{1-xb+yb}(Al, Ga)_{xb}(Ti, Ge)_{2-xb}Si_{yb}P_{3-yb}O_{12}$ (here, $0 \leq xb \leq 1$, and $0 \leq yb \leq 1$), $Li_7La_3Zr_2O_{12}$ having a garnet-type crystal structure, and the like. In addition, phosphorus compounds including Li, P, and O are also desirable. Examples thereof include lithium phosphate ($Li_3PO_4$), LiPON obtained by substituting some of oxygen atoms in lithium phosphate with nitrogen atoms, LiPOD (D is at least one selected from Ti, V, Cr, Mn, Fe, Co, Ni, Cu, Zr, Nb, Mo, Ru, Ag, Ta, W, Pt, Au, or the like), and the like. In addition, LiAON (A is at least one selected from Si, B, Ge, Al, C, Ga, or the like) and the like can also be preferably used.

Among these, $Li_{1+xb+yb}(Al, Ga)_{xb}(Ti, Ge)_{2-xb}Si_{yb}P_{3-yb}O_{12}$ (here, $0 \leq xb \leq 1$, and $0 \leq yb \leq 1$) is preferred since the compound has a high lithium ion-conducting property and is chemically stable and thus can be easily handled. These compounds may be used singly or in a combined form.

The ion conductivity of the lithium ion conductive oxide-based inorganic solid electrolyte is preferably $1 \times 10^{-6}$ S/cm or higher, more preferably $1 \times 10^{-5}$ S/cm or higher, and particularly preferably $5 \times 10^{-5}$ S/cm or higher.

In the present invention, among these, the oxide-based inorganic solid electrolyte is preferably used. Since the oxide-based inorganic solid electrolyte generally has a higher hardness, the interface resistance is easily increased in all solid-state secondary batteries, and the application of the oxide-based inorganic solid electrolyte leads to the consequent additional enhancement of the effects of the present invention. Particularly, the oxide-based inorganic solid electrolyte is hard and deteriorates moldability, and thus the roughness in the interfaces between the active material layers and the inorganic solid electrolyte layer after coating is likely to remain even after molding. Therefore, it is effective to apply the present invention or a preferred embodiment thereof for which manufacturing is controlled in the stage of coating.

In addition, in the present invention, the sulfide-based inorganic solid electrolyte is also preferably used since it is possible to improve the ion conductivity. Since the particles of the sulfide-based inorganic solid electrolyte have a low hardness and are easily crushed, it is possible to reduce excess crushing using low-density crushing particles.

The inorganic solid electrolytes may be used singly or in a combined form.

The concentration of the inorganic solid electrolyte in the solid electrolyte composition is preferably 50% by mass or higher, more preferably 70% by mass or higher, and particularly preferably 90% by mass or higher with respect to 100% by mass of the solid content when the satisfaction of both battery performance and the effect of reducing and maintaining the interface resistance is taken into account. From the same viewpoint, the upper limit thereof is preferably 99.9% by mass or lower, more preferably 99.5% by mass or lower, and particularly preferably 99% by mass or lower. However, when the inorganic solid electrolyte is jointly used with a positive electrode active material or a negative electrode active material described below, the total concentration of the positive electrode active material and the negative electrode active material is preferably in the above-described range.

Meanwhile, in the present specification, the solid content refers to a component that does not disappear due to volatilization or evaporation when a drying treatment is carried out at 100° C. Typically, components other than solvents or dispersion media are considered as the solid content.

(Binder)

In the solid electrolyte composition of the present invention, it is possible to use a binder. In such a case, the inorganic solid electrolyte particles are bonded together, whereby it is possible to realize a more favorable ion-conducting property. The kinds of the binder are not particularly limited, and it is possible to use, for example, styrene-acrylic copolymers (for example, refer to JP2013-008611A, the pamphlet of WO2011/105574A, and the like), butadiene hydride copolymers (for example, refer to JP1999-086899A (JP-H11-086899A), the pamphlet of WO2013/001623A, and the like), polyolefin-based polymers such as polyethylene, polypropylene, and polytetrafluoroethylene (for example, refer to JP2012-99315A), compounds having a polyoxyethylene chain (JP2013-008611A), norbornene-based polymers (JP2011-233422A), or the like.

The weight-average molecular weight of a high-molecular-weight compound constituting the binder is preferably 5,000 or more, more preferably 10,000 or higher, and particularly preferably 30,000 or higher. The upper limit thereof is preferably 1,000,000 or lower and more preferably 400,000 or lower. Unless particularly otherwise described, the molecular weight is measured under the conditions described in the following examples.

The glass transition temperature (Tg) of a binder polymer is preferably 100° C. or lower, more preferably 30° C. or lower, and particularly preferably 0° C. or lower from the viewpoint of improving the binding property. The lower limit thereof is preferably −100° C. or higher and more preferably −80° C. or higher from the viewpoint of manufacturing aptitude or performance stability.

The binder polymer may be crystalline or amorphous. In the case of crystalline binder polymers, the melting point is preferably 200° C. or lower, more preferably 190° C. or lower, and particularly preferably 180° C. or lower. The lower limit thereof is not particularly limited, but is preferably 120° C. or higher and more preferably 140° C. or higher.

The average particle diameter of binder polymer particles is preferably 0.01 µm or more, more preferably 0.05 µm or more, and particularly preferably 0.1 µm or more. The upper limit thereof is preferably 500 µm or less, more preferably 100 µm or less, and particularly preferably 10 µm or more.

The standard deviation of the particle size distribution is preferably 0.05 or higher, more preferably 0.1 or higher, and particularly preferably 0.15 or higher. The upper limit thereof is preferably 1 or lower, more preferably 0.8 or lower, and particularly preferably 0.6 or lower.

In the present invention, unless particularly otherwise described, the average particle diameter or the particle dispersibility of the polymer particles is measured under the conditions (dynamic light scattering method) employed in the following examples.

In the present invention, the particle diameters of the binder polymer particles are preferably smaller than the average particle diameter of the inorganic solid electrolyte particles. When the sizes of the polymer particles are set in the above-described range, it is possible to realize favorable adhesiveness and suppression of the interface resistance in association with the provision of a predetermined particle size distribution to the inorganic solid electrolyte particles. Meanwhile, measurement from the produced all solid-state secondary battery can be carried out by, for example, decomposing the battery, putting the electrodes into water, dispersing the materials thereof, then, filtering the materials, collecting the remaining solid, and measuring individual properties of the polymer. The particle diameter can be measured by, for example, decomposing the battery, peeling the electrodes, then, measuring the electrode materials, and excluding the measurement values of the particle diameters of particles that are not the polymer which has been measured in advance.

The amount of the binder blended is preferably 0.1 parts by mass or more, more preferably 0.3 parts by mass or more, and particularly preferably 1 part by mass or more with respect to 100 parts by mass of the inorganic solid electrolyte (including active materials in a case in which the active materials are used). The upper limit thereof is preferably 50 parts by mass or less, more preferably 20 parts by mass or less, and particularly preferably 10 parts by mass or less.

The amount of the binder in the solid content is preferably 0.1% by mass or more, more preferably 0.3% by mass or more, and particularly preferably 1% by mass or more of the solid electrolyte composition. The upper limit thereof is preferably 50% by mass or less, more preferably 20% by mass or less, and particularly preferably 10% by mass or less.

When the amount of the binder is set in the above-described range, it is possible to more effectively satisfy both the fixing property of the inorganic solid electrolyte and the interface resistance-suppressing property.

The binders may be used singly or in a combined form. In addition, the binder may be used in combination with other particles.

The binder particles may be made of only a specific polymer constituting the binder particles or may be constituted to include another material (a polymer, a low-molecular-weight compound, an inorganic compound, and the like).

(Lithium salt (electrolyte salt))

In the all solid-state secondary battery of the present invention, a lithium salt may be added to the solid electrolyte composition. The lithium salt is preferably a lithium salt that is ordinarily used for this kind of products and is not particularly limited, but preferred examples thereof include lithium salts described below.

(L-1) Inorganic lithium salts: salts of an inorganic fluoride such as $LiPF_6$, $LiBF_4$, $LiAsF_6$, and $LiSbF_6$; salts of a perhalogen acid such as $LiClO_4$, LiBrat, and $LiIO_4$; salts of an inorganic chloride such as $LiAlCl_4$, and the like.

(L-2) Fluorine-containing organic lithium salts: salts of a perfluoroalkanesulfonic acid such as $LiCF_3SO_3$; salts of a perfluoroalkanesulfonyl imide such as $LiN(CF_3SO_2)_2$, $LiN(CF_3CF_2SO_2)_2$, $LiN(FSO_2)_2$, and $LiN(CF_3SO_2)(C_4F_9SO_2)$; salts of a perfluoroalkanesulfonyl methide such as $LiC(CF_3SO_2)_3$; salts of a fluoroalkyl fluorinated phosphoric acid such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$, and the like.

(L-3) Oxalatoborate salts: lithium bis(oxalato)borate, lithium difluorooxalatoborate, and the like Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)$ are preferred, and salts of a lithium imide such as $LiPF_6$, $LiBF_4$, $LiN(Rf^1SO_2)_2$, $LiN(FSO_2)_2$, and $LiN(Rf^1SO_2)(Rf^2SO_2)$ are more preferred. Here, $Rf^1$ and $Rf^2$ each represents a perfluoroalkyl group.

In a case in which the lithium salt is used, the content thereof is preferably 0.1 parts by mass or more and more preferably 0.5 parts by mass or more with respect to 100 parts by mass of the inorganic solid electrolyte. The upper limit thereof is preferably 10 parts by mass or less and more preferably 5 parts by mass or less.

Meanwhile, the electrolytes that are used in the electrolytic solution may be used singly or in an arbitrarily-combined form.

(Dispersion Medium)

In the solid electrolyte composition of the present invention, a dispersion medium for dispersing the respective components described above may be used. In the production of the all solid-state secondary battery, the solid electrolyte composition is preferably made into a paste form by adding a dispersion medium thereto from the viewpoint of forming a film by uniformly applying the solid electrolyte composition. In the formation of the solid electrolyte layer in the all solid-state secondary battery, the dispersion medium is removed by means of drying.

Examples of the dispersion medium include water-soluble solvents. Specific examples thereof include the following media.

Alcohol Compound Solvents methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, 1,4-butanediol, and the like.

Ether Compound Solvents (Including Ether Compounds Containing a Hydroxyl Group)

dimethyl ether, diethyl ether, diisopropyl ether, dibutyl ether, t-butyl methyl ether, cyclohexyl methyl ether, anisole, tetrahydrofuran, alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and the like).

Amide Compound Solvents

N,N-dimethylformamide, 1-methyl-2-py rroli done, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, hexamethylphosphoric triamide, and the like.

Ketone Compound Solvents acetone, methyl ethyl ketone, methyl isobutyl ketone, cyclohexanone, and the like.

Aromatic Compound Solvents benzene, toluene, and the like.

Aliphatic Compound Solvents hexane, heptane, cyclohexane, methylcyclohexane, octane, pentane, cyclopentane, and the like.

Nitrile Compound Solvents acetonitrile and isobutyronitrile.

In the present invention, among these, the ether compound solvents, the ketone compound solvents, the aromatic compound solvents, and the aliphatic compound solvents are preferably used. The boiling point of the dispersion medium at normal pressure (1 atmosphere) is preferably 80° C. or higher and more preferably 90° C. or higher. The upper limit thereof is preferably 220° C. or lower and more preferably 180° C. or lower. The solubility of the binder in the dispersion medium at 20° C. is preferably 20% by mass or less, more preferably 10% by mass or less, and particularly preferably 3% by mass or less. The lower limit thereof is realistically 0.01% by mass or more.

The above-described dispersion media may be used singly or in a combined form.

The viscosity of the composition in the present invention is preferably 1 mPa·s or more, more preferably 2 mPa·s or more, and particularly preferably 5 mPa·s or more. The upper limit thereof is preferably 100,000 mPa·s or less, more preferably 10,000 mPa·s or less, and particularly preferably 5,000 mPa·s or less.

Unless particularly otherwise described, the viscosity is measured under the conditions described in the following examples.

In the present invention, the amount of the dispersion medium in the solid electrolyte composition can be set to an arbitrary amount in consideration of the balance between the viscosity of the solid electrolyte composition and the drying load. Generally, the amount of the dispersion medium in the solid electrolyte composition is preferably 20% to 99% by mass.

(Method for Preparing Solid Electrolyte Composition)

The solid electrolyte composition of the present invention may be prepared using an ordinary method, and examples thereof include methods in which the inorganic solid electrolyte particles are treated using a wet-type dispersion method or a dry-type dispersion method. Examples of the wet-type dispersion method include ball milling, beads milling, sand milling, and the like. Examples of the dry-type dispersion method include, similarly, ball milling, beads milling, sand milling, and the like. After dispersion, filtration is appropriately carried out, whereby it is possible to remove particles having particle diameters that are not a predetermined particle diameter or agglomerates.

In addition, in order to dispersion the inorganic solid electrolyte particles using a wet-type or dry-type method, it is possible to use a variety of dispersion media such as dispersion balls and dispersion beads. Among these, zirconia beads, titania beads, alumina beads, and steel beads which are high-specific gravity media are suitable.

(Positive Electrode Active Material)

Next, a positive electrode active material that is used in the solid electrolyte composition for forming the positive electrode active material layer in the all solid-state secondary battery of the present invention (hereinafter, also referred to as the composition for the positive electrode) will be described.

The positive electrode active material is preferably capable of reversibly intercalating and deintercalating lithium ions. The material is not particularly limited and may be a transition metal oxide, an element that can be complexed with Li such as sulfur, or the like. Among these, a transition metal oxide is preferably used, and the positive electrode active material more preferably has one or more elements selected from Co, Ni, Fe, Mn, Cu, and V as a transition metal element.

Specific examples of the transition metal oxide include (MA) transition metal oxides having a lamellar rock salt-type structure, (MB) transition metal oxides having a spinel-type structure, (MC) lithium-containing transition metal phosphate compounds, (MD) lithium-containing transition metal halogenated phosphate compounds, (ME) lithium-containing transition metal silicate compounds, and the like.

Specific examples of the transition metal oxides having a lamellar rock salt-type structure (MA) include lithium cobalt oxide ($LiCoO_2$, LCO), lithium nickel oxide ($LiNi_2O_2$), lithium nickel cobalt aluminum oxide ($LiNi_{0.85}Co_{0.10}Al_{0.05}O_2$ [NCA]), lithium nickel manganese cobalt acid ($LiNi_{0.33}Co_{0.33}Mn_{0.33}O_2$ [NMC]), and lithium manganese nickel oxide ($LiNi_{0.5}Mn_{0.5}O_2$).

Specific examples of the transition metal oxides having a spinel-type structure (MB) include $LiMn_2O_4$ (lithium manganite [LMO]), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, cobalt phosphates such as LiCoPO$_4$, and monoclinic NASICON-type vanadium phosphate salts such as Li$_3$V2(PO$_4$)$_3$ (lithium vanadium phosphate).

Examples of the lithium-containing transition metal halogenated phosphate compounds (MD) include iron fluorophosphate salts such as Li$_2$FePO$_4$F, fluoride, manganese fluorophosphate salts such as Li$_2$MnPO$_4$F, and cobalt phosphate fluorides such as Li$_2$CoPO$_4$F.

Examples of the lithium-containing transition metal silicate compounds (ME) include Li$_2$FeSiO$_4$, Li$_2$MnSiO$_4$, Li$_2$CoSiO$_4$, and the like.

The volume-average particle diameter (sphere-equivalent average particle diameter) of the positive electrode active material that can be used in the solid electrolyte composition of the present invention is not particularly limited. Meanwhile, the volume-average particle diameter is preferably 0.1 μm to 50 μm. In order for the positive electrode active material to obtain a predetermined particle diameter, an ordinary crusher or classifier may be used. A positive electrode active material obtained using a firing method may be used after being washed with water, an acidic aqueous solution, an alkaline aqueous solution, or an organic solvent. The volume-average particle diameter of the positive electrode active material can be measured using a laser diffraction/scattering particle size analyzer LA-920 (trade name, manufactured by Horiba Ltd.).

The concentration of the positive electrode active material is not particularly limited, but is preferably 10% to 90% by mass and more preferably 20% to 80% by mass with respect to 100% by mass of the solid components in the composition for the positive electrode.

The positive electrode active material may be used singly, or a combination of two or more positive electrode active materials may be used.

(Negative Electrode Active Material)

The solid electrolyte composition of the present invention may include a negative electrode active material. In such a case, it is possible to produce compositions for a negative electrode material. The negative electrode active material is preferably capable of reversibly intercalating and deintercalating lithium ions. The material is not particularly limited, and examples thereof include carbonaceous materials, metallic oxides such as tin oxide or silicon oxide, metallic complex oxides, a single lithium body or lithium alloys such as lithium aluminum alloys, metals capable of forming an alloy with lithium such as Sn and Si, and the like. Among these, carbonaceous materials or lithium complex oxides are preferably used from the viewpoint of reliability. In addition, the metallic complex oxides are preferably capable of absorbing and deintercalating lithium. These materials are not particularly limited, but preferably contain titanium and/or lithium as constituent components from the viewpoint of high-current density charge and discharge characteristics.

The carbonaceous material that is used as the negative electrode active material refers to a material substantially made of carbon. Examples thereof include carbonaceous materials obtained by firing petroleum pitch, natural graphite, artificial graphite such as highly oriented pyrolytic graphite, or a variety of synthetic resins such as PAN-based resins or furfuryl alcohol resins. Furthermore, examples thereof also include a variety of carbon fibers such as PAN-based carbon fibers, cellulose-based carbon fibers, pitch-based carbon fibers, vapor grown carbon fibers, dehydrated PVA-based carbon fibers, lignin carbon fibers, glassy carbon fibers, and active carbon fibers, mesophase spherule, graphite whisker, planar graphite, and the like.

These carbonaceous materials can also be classified into non-graphitizable carbonaceous materials and graphite-based carbon materials depending on the degree of graphitization. In addition, the carbonaceous material preferably has a surface separation, a density, and a size of crystallite which are described in JP1987-22066A (JP-S62-22066A), JP1990-6856A (JP-H02-6856A), and JP1991-45473A (JP-H03-45473A). The carbonaceous material does not need to be a single material, and it is also possible to use the mixture of natural graphite and artificial graphite described in JP1993-90844A (JP-HOS-90844A), graphite having a coating layer described in JP1994-4516A (JP-H06-4516A), or the like.

The metallic oxide and the metallic complex oxide which are applied as the negative electrode active material are particularly preferably amorphous oxides, and furthermore, a chalcogenide which is a reaction product between a metallic element and an element belonging to Group 16 of the periodic table is also preferably used. Amorphous oxides mentioned herein refer to oxides having a broad scattering band having a peak in a 2θ value range of 20° to 40° in an X-ray diffraction method in which CuKα rays are used and may have a crystalline diffraction ray. The strongest intensity in the crystalline diffraction ray visible in a 2θ value range of 40° or higher and 70° or lower is preferably 100 or less times and more preferably five or less times the diffraction ray intensity having a peak in a broad scattering band visible in a 2θ value range of 20° or higher and 40° or lower, and the amorphous oxides particularly preferably do not have any crystalline diffraction rays.

Among the above-described amorphous oxides and compound groups made of a chalcogenide, amorphous oxides of a semimetal element and chalcogenides are more preferred, and oxides made of one of elements belonging to Groups 13 (IIIB) to 15 (VB) of the periodic table, Al, Ga, Si, Sn, Ge, Pb, Sb, and Bi or a combination of two or more elements therefrom and chalcogenide are particularly preferred. Specific examples of the preferred amorphous oxides and chalcogenides preferably include Ga$_2$O$_3$, SiO, GeO, SnO, SnO$_2$, PbO, PbO$_2$, Pb$_2$O$_3$, Pb$_2$O$_4$, Pb$_3$O$_4$, Sb$_2$O$_3$, Sb$_2$O$_4$, Sb$_2$O$_5$, Bi$_2$O$_3$, Bi$_2$O$_4$, SnSiO$_3$, GeS, SnS, SnS$_2$, PbS, PbS$_2$, Sb$_2$S$_3$, Sb$_2$S$_5$, and SnSiS$_3$. In addition, the amorphous oxides and the chalcogenides may be complex oxides with lithium oxide, for example, Li$_2$SnO$_2$.

In consideration of the influence of the active material layer/the inorganic solid electrolyte layer on the interface roughness, the average particle diameter of the negative electrode active material is preferably 0.01 μm or more, more preferably 0.1 μm or more, still more preferably 0.5 μm or more, and particularly preferably 1 μm or more. The upper limit thereof is preferably 100 μm or less, more preferably 50 μm or less, still more preferably 10 μm or less, and particularly preferably 5 μm or less. In order to obtain a predetermined particle diameter, a well-known crusher or classifier may be used. For example, a mortar, a ball mill, a sand mill, an oscillatory ball mill, a satellite ball mill, a planetary ball mill, a vortex flow-type jet mill, a sieve, or the like is preferably used. During crushing, wet-type crushing in which water or an organic solvent such as methanol is caused to coexist can be carried out as necessary. In order to obtain a desired particle diameter, the negative electrode active material is preferably classified. The classification method is not particularly limited, and a sieve, a wind classifier, or the like can be used as necessary. Both dry-type classification and wet-type classification can be used.

The chemical formulae of compounds obtained using the above-described firing method can be computed using inductively coupled plasma (ICP) atomic emission spectroscopy as a measurement method or from the different in the mass of the powder before and after firing as a simple method.

Preferred examples of the negative electrode active material that can be jointly used with the amorphous oxide negative electrode active material mainly containing Sn, Si, and Ge include carbon materials capable of absorbing and emitting lithium ions or lithium metals, lithium, lithium alloys, and metals capable of forming alloys with lithium.

The negative electrode active material also preferably contains a titanium atom. More specifically, $Li_4Ti_5O_{12}$ is preferred since the volume thereof changes only to a small extent during the absorption and deintercalation of lithium ions, and thus $Li_4Ti_5O_{12}$ has excellent rapid charge/discharge characteristics, suppresses deterioration of electrodes, and is capable of improving the service lives of lithium ion secondary batteries. When a specific negative electrode and, furthermore, a specific electrolytic solution are combined together, the stability of secondary batteries improves in a variety of use conditions.

The concentration of the negative electrode active material is not particularly limited, but is preferably 10% to 80% by mass and more preferably 20% to 70% by mass with respect to 100% by mass of the solid content in the solid electrolyte composition.

Meanwhile, in the above-described embodiment, an example in which the positive electrode active material or the negative electrode active material is added to the solid electrolyte composition according to the present invention has been described, but the present invention is not interpreted to be limited thereto. For example, as a composition not including the inorganic solid electrolyte particles, paste including a positive electrode active material or a negative electrode active material may be prepared. In addition, a conduction aid may be appropriately added to the positive and negative electrode active material layers as necessary. As an ordinary electron-conducting material, a carbon fiber such as graphite, carbon black, acetylene black, Ketjen black, or a carbon nanotube, metal powder, a metal fiber, a polyphenylene derivative, or the like can be added thereto.

The negative electrode active materials may be used singly or in a combined form.

<Collectors (Metal Foil)>

As the collectors for the positive and negative electrodes, electron conductors not causing chemical changes are preferably used. The collector for the positive electrode is preferably aluminum, stainless steel, nickel, titanium, and additionally, a collector obtained by treating the surface of aluminum or stainless steel with carbon, nickel, titanium, or silver, and, among these, aluminum and aluminum alloys are more preferred. The collector for the negative electrode is preferably aluminum, copper, stainless steel, nickel, or titanium and more preferably aluminum, copper, or a copper alloy.

As the shape of the collectors, generally, collectors having a film sheet shape are used, but it is also possible to use nets, punched articles, lath bodies, porous bodies, foaming bodies, compacts of fiber groups, and the like. The thicknesses of the collectors are not particularly limited, but are preferably 1 μm to 500 μm. In addition, it is also preferable to impart protrusions and recessed to the collector surface by means of a surface treatment.

<Production of All Solid-State Secondary Battery>

The all solid-state secondary battery may be produced using an ordinary method. Specific examples thereof include methods in which the solid electrolyte composition is applied onto a metal foil which serves as the collector, thereby producing an electrode sheet for a battery having a film formed thereon. For example, a composition which serves as a positive electrode material is applied onto a metal foil, thereby forming a film. Next, a composition of the inorganic solid electrolyte is applied onto the upper surface of the positive electrode active material layer in the electrode sheet for a battery, thereby forming a film. Furthermore, a film of a negative electrode active material is formed in the same manner so as to impart a collector (metal foil) for the negative electrode, whereby it is possible to obtain a desired structure of the all solid-state secondary battery. Meanwhile, the respective compositions described above may be applied using an ordinary method. At this time, after the respective application of the composition forming the positive electrode active material layer, the composition forming the inorganic solid electrolyte layer, and the composition forming the negative electrode active material layer, a heating treatment is preferably carried out. The heating temperature is not particularly limited, but is preferably 30° C. or higher and more preferably 60° C. or higher. The upper limit thereof is preferably 300° C. or lower and more preferably 250° C. or lower. When the compositions are heated in the above-described temperature range, it is possible to preferably soften the binder. In such a case, in the all solid-state secondary battery, it is possible to obtain a favorable bonding property and a favorable ion-conducting property under no pressurization in the all solid-state secondary battery.

Hereinafter, the method for producing a solid electrolyte composition will be described in more detail by illustrating an example of a process for producing an all solid-state secondary battery. Hereinafter, the dispersion of the solid electrolyte composition will be described, and, regarding the crushing treatment of the inorganic solid electrolyte, the description of the crushing treatment for the inorganic solid electrolyte particles is preferably applied.

(Dispersion)

The solid electrolyte composition of the present invention may be subjected to mechanical dispersion or a crushing treatment. Examples of a method for crushing the inorganic solid electrolyte in the solid electrolyte composition include a mechanical dispersion method. As the mechanical dispersion method, a ball mill, a beads mill, a planetary mixer, a blade mixer, a roll mill, a kneader, a disc mill, or the like can be used.

In the case of dispersion using a ball mill, examples of the material of balls in the ball mill include agate, sintered alumina, tungsten carbide, chromium steel, stainless steel, zirconia, plastic polyamide, nylon, silicon nitride, TEFLON (registered trademark), and the like. As balls that are used during the dispersion using the ball mill, the same kind of balls may be used, or two or more different kinds of balls may be used. In addition, during the dispersion, new balls may be added thereto, or the balls may be exchanged with balls having a different shape, size, and material. The preferred amount of the balls in a container is not particularly specified, and the container may be fully filled with balls. The amount of contaminants derived from balls or devices which are generated due to impact from mechanical dispersion in the dispersion of the solid electrolyte composition is not particularly specified. The amount of contaminants can also be suppressed to 10 ppm or lower.

In the mechanical dispersion of the crushing treatment, a single inorganic solid electrolyte can be dispersed, or two or more inorganic solid electrolytes can be dispersed at the same time. The dispersion may be carried out in a single stage or in two stages. In addition, it is also possible to add the positive or negative electrode active material, the inorganic solid electrolyte, the binder, a dispersant, the dispersion medium, the conduction aid, the lithium salt, and the like between the respective stages. In a case in which the dispersion is carried out in multiple stages, it is also possible to change the parameters (the dispersion duration, the dispersion speed, the dispersion base material, and the like) of devices relating to the dispersion in the respective stages.

The dispersion method may be wet-type dispersion in which a dispersion medium is used or dry-type dispersion in which a dispersion medium is not used; however, in the present invention, wet-type dispersion is carried out.

Generally, the dispersion medium may partially dissolve the inorganic solid electrolyte during the dispersion. In this case, it is also possible to regenerate the dissolved portion into the original inorganic solid electrolyte by heating the dissolved portion during drying. In addition, even in a case in which the dispersion medium is a water-containing solvent (containing 100 ppm or more of moisture), it is also possible to regenerate the inorganic solid electrolyte by heating and drying the dissolved portion after the dispersion or heating and drying the dissolved portion in a vacuum.

The dispersion duration is not particularly specified, but is generally ten seconds to ten days. The dispersion temperature is not particularly specified, but is generally in a range of −50° C. to 100° C.

The volume-average particle diameter of the inorganic solid electrolyte dispersed as described above is not particularly limited, but is preferably 0.01 µm or larger, more preferably 0.05 µm or larger, and still more preferably 0.1 µm or larger. The upper limit thereof is preferably 500 µm or smaller, more preferably 100 µm or smaller, still more preferably 50 µm or smaller, particularly preferably 10 µm or smaller, and most preferably 5 µm or smaller. The volume-average particle diameter can be measured using a laser diffraction/scattering particle size analyzer LA-920 (trade name, manufactured by Horiba Ltd.).

Before and after the dispersion step, the shape of the inorganic solid electrolyte may be maintained as it is or changed.

In a case in which an electrode sheet for a battery, a sheet for a battery such as a solid electrolyte sheet, and furthermore, an all solid-state secondary battery are manufactured using a solid electrolyte dispersion in the present invention, regarding the drying in the above-described method for producing a solid electrolyte composition of the present invention, the solid electrolyte dispersion is preferably dried after being applied so as to form a coating film instead of being immediately dried. As the drying method, any method of blow drying, heating drying, vacuum drying, and the like can be used.

Hereinafter, a process for producing an all solid-state battery using the solid electrolyte dispersion in the present invention will be further described.

(Coating)

In the application of the solid electrolyte composition, the dispersion of the solid electrolyte composition which has been prepared above may be used as it is, but it is also possible to add the dispersion medium used in the above-described dispersion operation or a different solvent to the solid electrolyte composition or dry the solid electrolyte composition and then re-disperse the solid electrolyte composition using a dispersion medium different from the dispersion medium used in the above-described dispersion operation.

The solid electrolyte composition that is used in coating may be prepared by mixing two or more kinds of slurries including particles with different degrees of dispersion or different volume-average particle diameters depending on the difference of the dispersion process.

To the solid electrolyte composition that is used in coating, the positive or negative electrode active material may be added after only the inorganic solid electrolyte and the dispersion medium are mixed together, or the positive or negative electrode active material, the inorganic solid electrolyte, and the dispersion medium may be dispersed together. Here, in a case in which an additive such as a binder is used, the additive such as a binder may be added thereto before or after the dispersion of the inorganic solid electrolyte.

Coating may be any one of wet-type coating and dry-type coating. Rod bar coating (a bar coating method), reverse roll coating, direct roll coating, blade coating, knife coating, extrusion coating, curtain coating, gravure coating, dip coating, squeeze coating, or the like can be used.

The speed of the coating can be changed depending on the viscosity of the inorganic solid electrolyte composition.

The coating film desirably maintains a uniform film thickness from the beginning to the end of the coating. In the case of coating using a bar coating method, generally, there is a tendency that the coating film is thick in the beginning of the coating and becomes thinner as the coating proceeds and the thickness of the coating film decreases from the central portion to the peripheral portion. In order to prevent the above-described tendency, it is also possible to design the bar coater and the coating table so that the clearance therebetween increases from the beginning of the coating to the end of the coating. Specifically, it is possible to consider a design in which slits are provided in the coating table and the depth of the slit grooves increases as the coating proceeds. Here, a support to be coated is installed on the slits. The coating bar is maintained horizontally with respect to the coating table. In such a case, it is possible to gradually increase the clearance. In addition, there is another method in which vibrations are imparted before the coated film is fully dried, thereby evening the film thickness of the coated film.

It is also possible to coat the positive electrode active material layer, the inorganic solid electrolyte layer, and the negative electrode active material layer stepwise while drying these layers or superimpose and coat multiple different layers while these layers remain wet. In a case in which different layers are coated, it is also possible to coat the layers with a solvent or a dispersion medium that is different from solvents or dispersion mediums that are used to coat adjacent layers.

As the inorganic solid electrolyte that is used in the inorganic solid electrolyte layer, one kind of the sulfide-based inorganic solid electrolytes or the oxide-based inorganic solid electrolytes described above may be used singly and two or more kinds of the sulfide-based inorganic solid electrolytes or the oxide-based inorganic solid electrolytes, having different element compositions and/or crystal structures, may be used in combination. In addition, different inorganic solid electrolytes may be used in portions in contact with the electrode layer (the positive or negative electrode active material layer) and in the inorganic solid electrolyte layer, respectively.

(Drying)

In the electrode sheet for a battery, the solid electrolyte sheet, a sheet and a battery sheet made up of two or more layers of a combination thereof which have been produced by means of coating, the coating solvent or the dispersion medium is dried. As the drying method, any method of blow drying, heating drying, vacuum drying, and the like can also be used.

(Pressing)

The electrode sheet for a battery or the all solid-state secondary battery may be pressurized after being formed or produced by means of coating. Examples of a pressurization method include a hydraulic cylinder presser and the like. The pressure in the pressurization is generally in a range of 50 MPa to 1,500 MPa. Heating may be carried out at the same time as the pressurization. The heating temperature is generally in a range of 30° C. to 300° C.

In addition, the electrode sheet for a battery or the all solid-state secondary battery can be pressed at a temperature higher than the glass transition temperature of the inorganic solid electrolyte. Meanwhile, in a case in which the inorganic solid electrolyte and the binder coexist, it is also possible to press the electrode sheet for a battery or the all solid-state secondary battery at a temperature higher than the glass transition temperature of the binder. However, generally, the pressurization temperature does not exceed the melting point of the binder.

The pressurization may be carried out in a state in which the coating solvent or the dispersion medium has been dried in advance or may be carried out in a state in which the solvent or the dispersion medium remains.

The atmosphere during the pressurization may be any one of in the air, in dried air (with a dew point of −20° C. or lower), in an inert gas (for example, argon, helium, or nitrogen), or the like.

Regarding the pressing duration, a high pressure may be applied for a short period of time (for example, several hours or shorter), or an approximately intermediate pressure may be applied for a long period of time (for example, one or more days). In the case of, for example, an all solid-state secondary battery other than the electrode sheet for a battery or the solid electrolyte sheet, it is also possible to use a restraining device (a screw bracket or the like) for the all solid-state secondary battery in order to continuously apply an approximately intermediate pressure.

The pressing pressure may be uniform or different on the surface of a coated sheet.

The pressing pressure can be changed depending on the area or film thickness of a portion to be pressed. In addition, it is also possible to change the pressure in the same position stepwise.

The pressing surface may be flat or be roughened.

(Attachment)

When different layers are attached together, the contact surfaces of both layers are also preferably wetted with an organic solvent, an organic substance, or the like. In the attachment of electrodes, the solid electrolyte layer may be applied to either or both layers and the layer may be attached together before the solid electrolyte layer is dried.

The temperature during the attachment may be room temperature or a temperature which is equal to or higher than room temperature and is close to the glass transition temperature of the inorganic solid electrolyte.

(Initialization)

Charging and discharging is carried out in a state in which the pressing pressure has been increased, and then the pressure is released until the pressure reaches a pressure at which the all solid-state secondary battery is generally used.

<Chassis>

An electrode sheet having the basic structure of the all solid-state secondary battery can be produced by disposing the respective members described above. Depending on use, the all solid-state secondary battery can also be used as an all solid-state secondary battery as it is, but may be further sealed in an appropriate chassis in order to have a dry battery cell form. A metal chassis or a resin (plastic) chassis may be used. In a case in which a metal chassis is used, examples thereof include aluminum alloy chasses and stainless steel chasses. The metal chasses are separately used as the chassis for the positive electrode and the chassis for the negative electrode and are electrically connected to the positive electrode collector and the negative electrode collector respectively. The chassis for the positive electrode and the chassis for the negative electrode are joined together through a gasket for short-circuit prevention and are thus integrated.

<Use of All Solid-State Secondary Battery>

The all solid-state secondary battery according to the present invention can be applied to a variety of uses. The application aspect is not particularly limited; however, in a case in which the all solid-state secondary battery is mounted in an electronic device, examples of the application aspect include laptop personal computers, stylus-input personal computers, mobile personal computer, electronic book players, mobile phones, cordless phone extension master stations, pagers, handy terminals, portable fax machines, mobile copiers, portable printers, headphone stereos, video movies, liquid crystal televisions, handy cleaners, portable CDs, mini discs, electric shavers, transceivers, electronic organizers, calculators, memory cards, portable tape recorders, radios, backup power supplies, and the like. Additionally, examples of the consumer uses include automobiles, electric vehicles, motors, lighting equipment, toys, game devices, load conditioner, clocks, strobes, cameras, medical devices (pacemakers, hearing aids, shoulder massage machine, and the like), and the like. Furthermore, the all solid-state secondary battery can be used for a variety of military uses and space uses. In addition, the all solid-state secondary battery can be combined with solar batteries.

Among these, the all solid-state secondary battery is preferably applied to applications requiring a high capacitance and high-rate discharge characteristics. For example, in storage facilities and the like in which an increase in the capacitance is anticipated in the future, high reliability become essential, and furthermore, battery performance is also required. In addition, high-capacitance secondary batteries are mounted in electric vehicles and the like, domestic uses in which batteries need to be charged everyday are anticipated, and thus better reliability with respect to excessive charging is required. The present invention is capable of preferably coping with the above-described use aspects and thus exhibiting the excellent effects thereof.

According to the preferred embodiment of the present invention, individual application forms described below are found.

Solid electrolyte compositions (electrode compositions for positive electrodes or negative electrodes) including an active material capable of intercalating and deintercalating ions of a metal belonging to Group I or II of the periodic table Electrode sheets for a battery obtained by applying the solid electrolyte composition onto a metal foil so as to form a film Electrode sheets for a battery including a positive electrode active material layer, a negative electrode active material layer, and an inorganic solid electrolyte layer, in which at least one of the positive electrode active material layer, the negative electrode active material layer, or the inorganic solid electrolyte layer includes inorganic solid electrolyte particles satisfying the above-described data A All solid-state secondary batteries in which at least one of a positive electrode active material layer, a negative electrode active material layer, or an inorganic solid electrolyte layer includes inorganic includes a binder All solid-state secondary battery in which inorganic solid electrolyte particles satisfying the above-described data A which are included in at least one of a positive electrode active material layer, a negative electrode active material layer, or an inorganic solid electrolyte layer are oxide-based inorganic solid electrolyte particles Methods for manufacturing a solid electrolyte composition in which a composition of inorganic solid electrolyte particles that are used in all solid-state secondary batteries is prepared using a method for manufacturing inorganic solid electrolyte particles Methods for manufacturing an electrode sheet for a battery including a step of disposing a solid electrolyte composition obtained using the above-described manufacturing method on a metal foil and forming a film (imparting a film on a metal foil)

Methods for manufacturing an all solid-state secondary battery in which all solid-state secondary batteries are manufactured using the above-described method for manufacturing an electrode sheet for a battery The all solid-state secondary battery refers to a secondary battery in which a positive electrode, a negative electrode, and an electrolyte are all solid. In other words, the all solid-state secondary battery is differentiated from electrolytic solution-type secondary batteries in which a carbonate-based solvent is used as the electrolyte. Among these, the present invention is assumed as an inorganic all solid-state secondary battery. All solid-state secondary batteries are classified into high-molecular-weight all solid-state secondary batteries in which a high-molecular-weight compound such as polyethylene oxide is used as the electrolyte and inorganic all solid-state secondary batteries in which LLT, LLZ, or the like is used. Meanwhile, a high-molecular-weight compound can be applied as a binder for positive electrode active materials, negative electrode active materials, and inorganic solid electrolyte particles without hindering the application of high-molecular-weight compounds to inorganic all solid-state secondary batteries.

The inorganic solid electrolyte is differentiated from an electrolyte in which the above-described high-molecular-weight compound is used as an ion-conducting medium (high-molecular-weight electrolyte), and an inorganic compound serves as an ion-conducting medium. Specific examples thereof include LLT and LLZ described above. The inorganic solid electrolyte does not deintercalate cations (Li ions) for itself and exhibits an ion-transporting function. In contrast, although there are cases in which a material which is added to an electrolytic solution or a solid electrolyte layer and serves as an ion supply source for deintercalating cations (Li ions) is referred to as an electrolyte, when an electrolyte as the ion-transporting material needs to be differentiated, the above-described material is referred to as "electrolyte salt" or "supporting electrolyte". Examples of the electrolyte salt include lithium bistrifluoromethanesulfoneimide (LiTFSI).

"Compositions" mentioned in the present invention refer to mixtures in which two or more components are homogeneously mixed together. Compositions need to be substantially homogeneous and may include agglomerated portions or localized portions as long as desired effects are exhibited. In addition, solid electrolyte compositions mentioned in the present invention refer to compositions which basically serve as materials for forming the electrolyte layer (typically in a paste form), and electrolyte layers formed by curing this composition are not considered as the solid electrolyte composition.

EXAMPLES

Hereinafter, the present invention will be described in more detail on the basis of examples, but the present invention is not interpreted to be limited thereto. In the following examples, "parts" and "%" are mass-based unless particularly otherwise described.

Example of Preparation of Solid Electrolyte Composition

Crushing particles shown in Table 1 were injected into a crushing tank in a 45 mL zirconia container (planetary ball mill P-7 manufactured by Fritsch Japan Co., Ltd.) under conditions shown in Table 1, and an inorganic solid electrolyte LLT or LLZ (all manufactured by Toshima Manufacturing Co., Ltd.) shown in Table 1 or a sulfide (S-1) (9.0 g), hydrogenated styrene butadiene rubber (HSBR, manufactured by JSR Corporation, trade name "DYNARON 1321P") (0.3 g) as a binder, and toluene (15.0 g) as a crushing medium (dispersion medium) were added thereto. After that, the lid of the apparatus was opened, and wet-type dispersion was carried out for 90 minutes at the rotation speed shown in Table 1, thereby obtaining a solid electrolyte composition. The average particle diameter of inorganic solid electrolyte particles was as shown in the table. The viscosity was 540 mPa·s (25° C.).

Meanwhile, the weight-average molecular weight of HSBR was 200,000, and Tg was −50° C.

Preparation of Composition for Secondary Battery Positive Electrode

Lithium cobaltate (100 parts), acetylene black (5 parts), the solid electrolyte composition obtained above (75 parts), and N-methyl pyrrolidone (270 parts) were added to a planetary mixer (TK HIVIS MIX, manufactured by PRIMIX Corporation) and were stirred at 40 rpm for one hour. The viscosity was 120 mPa·s (25° C.).

Preparation of Composition for Secondary Battery Negative Electrode

Graphite (spheroidized graphite powder manufactured by Nippon Graphite Industries, Co., Ltd.) (100 parts), acetylene black (5 parts), the solid electrolyte composition obtained above (75 parts), and N-methyl pyrrolidone (270 parts) were added to a planetary mixer (TK HIVIS MIX, manufactured by PRIMIX Corporation) and were stirred at 40 rpm for one hour. The viscosity was 110 mPa·s (25° C.).

Production of Positive Electrode for Secondary Battery

The composition for a positive electrode in a secondary battery obtained above was applied onto a 20 μm-thick stainless steel (SUS316L) foil using an applicator having an arbitrary clearance, was heated at 80° C. for one hour and, furthermore, at 110° C. for one hour, and the coating solvent (dispersion medium) was dried. After that, the composition was heated and pressurized so as to obtain an arbitrary density using a heat pressing machine, thereby obtaining a positive electrode for a secondary battery.

Production of Electrode Sheet for Secondary Battery

The solid electrolyte composition obtained above was applied onto the positive electrode for a secondary battery obtained above using an applicator having an arbitrary clearance and was heated at 80° C. for one hour and, furthermore, at 110° C. for one hour, thereby forming an inorganic solid electrolyte layer. After that, the composition for a secondary battery negative electrode obtained above was further applied onto the inorganic solid electrolyte layer and was heated at 80° C. for one hour and, furthermore, at 110° C. for one hour, thereby forming a negative electrode layer. A 20 μm-thick stainless steel (SUS316L) foil was matched onto the negative electrode layer and was heated and pressurized so as to obtain an arbitrary density using a heat pressing machine, thereby obtaining an electrode sheet for a secondary battery.

The obtained electrode sheet for a secondary battery had a constitution of FIG. 1 and had a laminated structure of the stainless steel foil/the negative electrode active material layer/the inorganic solid electrolyte layer/the positive electrode for a secondary battery (the positive electrode active material layer/the stainless steel foil). The thicknesses of the positive electrode active material, the solid electrolyte layer, and the negative electrode active material layer were respectively 200 μm.

TABLE 1

| | | | Example | | | | | |
|---|---|---|---|---|---|---|---|---|
| | | | 101 | 102 | 103 | 104 | 105 | 106 |
| Raw material (before dispersion) | Inorganic solid electrolyte | | LLT | LLT | LLT | LLZ | LLZ | S-1 |
| | Average particle diameter (di) | μm | 3.23 | 3.23 | 3.23 | 8.14 | 8.14 | 2.00 |
| | D90 | μm | 6.00 | 6.00 | 6.00 | 18.50 | 18.50 | 5.00 |
| | Maximum particle diameter (dim) | μm | 40.4 | 40.4 | 40.4 | 62.2 | 62.2 | 19.2 |
| Dispersion condition | Crushing particles | | Zirconia | Zirconia | Zirconia | Zirconia | Zirconia | Polyamide |
| | Density (average) | g/cm³ | 6.1 | 6.1 | 6.1 | 6.1 | 6.1 | 1.1 |
| | Average particle diameter (φ) | mm | 1.0 | 3.0 | 3.0 | 3.0 | 3.0 | 6.4 |
| | Diameter ratio (φ/dim) | | 25 | 74 | 74 | 48 | 48 | 331 |
| | Diameter ratio (φ/di) | | 310 | 929 | 929 | 369 | 369 | 3175 |
| | Diameter ratio (φ/df) | | 414 | 1261 | 1277 | 433 | 447 | 3528 |
| | Volume (Z) | cm³/particle | 0.000524 | 0.014137 | 0.014137 | 0.014137 | 0.014137 | 0.134066 |
| | Total weight | g | 164 | 164 | 164 | 164 | 164 | 12 |
| | Number | particles | 51300 | 1900 | 1900 | 1900 | 1900 | 78 |
| | Container volume ($V_0$) | cm³ | 45 | 45 | 45 | 45 | 45 | 45 |
| | Filling percentage (α) | % | 60 | 60 | 60 | 60 | 60 | 23 |
| | Rotation speed | rpm | 370 | 370 | 370 | 370 | 370 | 370 |
| | Time | hr | 4 | 4 | 2 | 4 | 2 | 2 |
| | Temperature | ° C. | 20 | 20 | 20 | 20 | 20 | 20 |
| Particles after dispersion (after dispersion) | Average particle diameter (df) | μm | 2.41 | 2.38 | 2.35 | 6.94 | 6.71 | 1.80 |
| | D90 | μm | 4.63 | 3.89 | 4.24 | 14.27 | 15.56 | 4.31 |
| | Maximum particle diameter (dfm) | μm | 26.2 | 24.0 | 22.0 | 52.3 | 48.0 | 14.5 |
| | Unevenness coefficient (FU) | | 0.92 | 0.95 | 0.96 | 0.89 | 0.86 | 0.94 |
| | Flatness ratio (Feret's diameter) | | 1.63 | 1.58 | 1.56 | 1.74 | 1.68 | 1.59 |
| | Degree of being truly spherical (Rc) | | 1.09 | 1.05 | 1.04 | 1.16 | 1.12 | 1.06 |
| Ion conductivity | | mS/cm | 0.06 | 0.15 | 0.17 | 0.30 | 0.33 | 0.20 |

| | | | Comparative Example | | | | | |
|---|---|---|---|---|---|---|---|---|
| | | | c01 | c02 | c03 | c04 | c05 | c06 |
| Raw material (before dispersion) | Inorganic solid electrolyte | | LLT | LLT | LLZ | LLT | LLT | S-1 |
| | Average particle diameter (di) | μm | 3.23 | 3.23 | 8.14 | 3.23 | 3.23 | 2.00 |
| | D90 | μm | 6.00 | 6.00 | 18.50 | 6.00 | 6.00 | 5.00 |
| | Maximum particle diameter (dim) | μm | 40.4 | 40.4 | 62.2 | 40.4 | 40.4 | 19.2 |

TABLE 1-continued

| Dispersion condition | Crushing particles | | Zirconia | Zirconia | Zirconia | Zirconia | Zirconia | Zirconia |
|---|---|---|---|---|---|---|---|---|
| | Density (average) | g/cm³ | 6.1 | 6.1 | 6.1 | 6.1 | 6.1 | 6.1 |
| | Average particle diameter ($\phi$) | mm | 1.0 | 3.0 | 3.0 | 5.0 | 1.0 | 5.0 |
| | Diameter ratio ($\phi$/dim) | | 25 | 74 | 48 | 124 | 25 | 124 |
| | Diameter ratio ($\phi$/di) | | 310 | 929 | 369 | 1549 | 310 | 1549 |
| | Diameter ratio ($\phi$/df) | | 427 | 1316 | 180 | 2358 | 424 | 3759 |
| | Volume (Z) | cm³/particle | 0.000524 | 0.014137 | 0.014137 | 0.065450 | 0.000524 | 0.065450 |
| | Total weight | g | 66 | 66 | 66 | 66 | 169 | 66 |
| | Number | particles | 20630 | 764 | 764 | 165 | 52748 | 165 |
| | Container volume ($V_0$) | cm³ | 45 | 45 | 45 | 45 | 45 | 45 |
| | Filling percentage ($\alpha$) | % | 24 | 24 | 24 | 24 | 50 | 24 |
| | Rotation speed | rpm | 370 | 370 | 370 | 370 | 370 | 370 |
| | Time | hr | 4 | 4 | 4 | 4 | 4 | 2 |
| | Temperature | °C. | 20 | 20 | 20 | 20 | 20 | 20 |
| Particles after dispersion (after dispersion) | Average particle diameter (df) | μm | 2.34 | 2.28 | 16.67 | 2.12 | 2.36 | 1.33 |
| | D90 | μm | 4.24 | 3.57 | 13.08 | 3.27 | 3.57 | 3.20 |
| | Maximum particle diameter (dfm) | μm | 22.0 | 20.2 | 44.0 | 37.0 | 22.0 | 11.2 |
| | Unevenness coefficient (FU) | | 0.84 | 0.82 | 0.82 | 0.80 | 0.84 | 0.78 |
| | Flatness ratio (Feret's diameter) | | 1.79 | 1.83 | 1.83 | 1.88 | 1.79 | 1.75 |
| | Degree of being truly spherical (Rc) | | 1.19 | 1.22 | 1.22 | 1.25 | 1.19 | 1.17 |
| Ion conductivity | | mS/cm | 0.02 | 0.01 | 0.20 | 0.00 | 0.02 | 0.06 |

<Notes in the table>
LLT: $Li_{0.33}La_{0.55}TiO_3$
LLZ: $Li_7La_3Zr_2O_{12}$
S-1: A sulfide-based inorganic solid electrolyte (S-1) synthesized below <Synthesis of Sulfide-Based Inorganic Solid Electrolyte (S-1)>

In a glove box in an argon atmosphere (dew point: −70° C.), lithium sulfide ($Li_2S$, manufactured by Sigma-Aldrich Co., LLC., purity>99.98%, 2.42 g) and phosphorus pentasulfide ($P_2S_5$, manufactured by Sigma-Aldrich Co., LLC., purity>99%, 3.90 g) were respectively weighed and put into an agate mortar and were mixed together for five minutes using the agate mortar. The molar ratio between $Li_2S$ and $P_2S_5$ was set to 75:25 ($Li_2S:P_2S_5$).

After that, 66 zirconia beads having a diameter of 5 mm were put into a 45 mL zirconia container (manufactured by Fritsch Japan Co., Ltd.), the above-described mixture was all put into the container, and the container was fully sealed in an argon atmosphere. The container was set in a planetary ball mill P-7 (trade name) manufactured by Fritsch Japan Co., Ltd., and mechanical milling was carried out for 20 hours at 25° C. and a rotation speed of 510 rpm, thereby obtaining a sulfide-based inorganic solid electrolyte of sulfur powder of (S-1) which was Li—P—S-based glass (6.20 g).

From the above-described result, it is found that, according to the present invention, an improved high ion conductivity is exhibited in all solid-state secondary batteries. Meanwhile, in Comparative Example c03, a relatively high conductivity of 0.20 mS/cm is exhibited, but this result from the use of LLZ as the electrolyte material. From the comparison between LLT and LLZ, the effects of the present invention become clear.

Methods for measuring the respective parameters are as described below.

<Method for Measuring Particle Diameter>

The particle diameters were measured using a laser diffraction/scattering-type particle size distribution analyzer (MICROTRACK MT3000 "trade name" manufactured by Nikkiso Co., Ltd.). The order was as described below. The inorganic solid electrolyte dispersion was separated into a 20 ml sample bottle and was diluted and adjusted with toluene so that the concentration of the solid content reached 0.2% by mass. Data were imported 50 times using a silica cell for measurement (2 ml) at a temperature of 25° C., and the obtained volume-based arithmetic average was used as the average particle diameters. For other detailed conditions and the like, description in JIS Z8825:2013 "Particle size analysis-Dynamic light scattering (DLS)" is referred to. Five specimens were produced every level, and the average values were employed.

<Measurement of Ion Conductivity>

Figure 6:
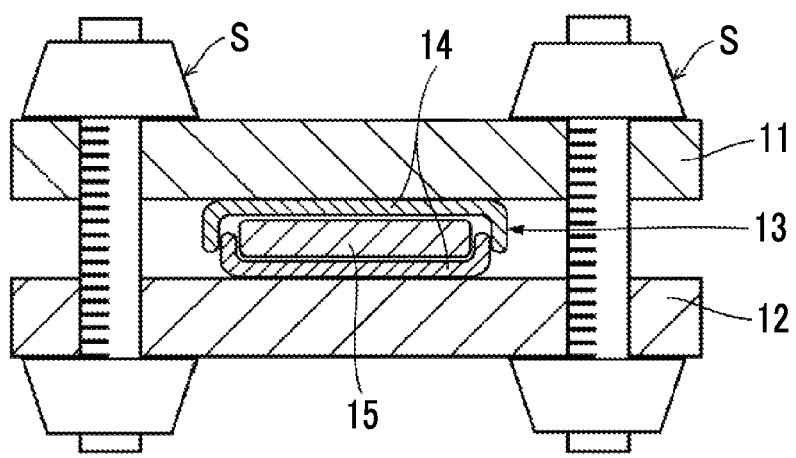
FIG. 6 is a vertical cross-sectional view schematically illustrating a testing instrument used in examples.

A disc-shaped piece having a diameter of 14.5 mm was cut out from the electrode sheet for a secondary battery obtained above and was put into a stainless steel 2032-type coin case into which a spacer and a washer were incorporated, thereby producing a coin battery. As illustrated in FIG. 6, the coin battery was sandwiched using a holding device capable of applying a pressure between the electrodes, and a confining pressure was applied so that the pressure between the electrodes reached 500 kgf/cm², thereby producing a coin battery.

Meanwhile, in FIG. 6, a reference sign 11 indicates an upper portion-supporting plate, a reference sign 12 indicates a lower portion-supporting plate, a reference sign 13 indicates the coin battery, a reference sign 14 indicates a coin case, a reference sign 15 indicates a battery sheet (battery sheet for a secondary battery), and a reference sign S indicates a screw.

The alternating-current impedance at a voltage amplitude of 5 mV in a frequency range of 1 MHz to 1 Hz was measured in a constant-temperature tank (30° C.) using the coin battery obtained above and a 1255B FREQUENCY RESPONSE ANALYZER (trade name) manufactured by Solartron Analytical. The resistance in the film thickness direction for specimens was obtained in the above-described manner and was computed using Expression (4) below.

Ion conductivity(mS/cm)=1000×specimen film thickness (cm)/(resistance (Ω)×specimen area(cm²))  Expression (4)

<Molecular Weight>

In the present invention, unless particularly otherwise described, the molecular weights of high-molecular-weight compounds (polymers) refer to weight-average molecular weights, and values measured in terms of the following standard specimen by means of gel permeation chromatography (GPC) were employed. Measurement devices and measurement conditions were based on those according to the following condition 1, and the condition 2 can be employed depending on the solubility of specimens and the like. However, depending on the kinds of polymers, more appropriate and proper carriers (eluants) and columns suitable for the carriers may be selected and used.

(Condition 1)

Measurement device: EcoSEC HLC-8320 (trade name, manufactured by Tosoh Corporation)
Columns: Columns connecting TOSOH TSKgel Super HZM-H, TOSOH TSKgel Super HZ4000, and TOSOH TSKgel Super HZ2000 were used
Carrier: Tetrahydrofuran
Measurement temperature: 40° C.
Carrier flow rate: 1.0 ml/min
Specimen concentration: 0.1% by mass
Detector: Refractive index (RI) detector
Standard specimen: Polystyrene
(Condition 2)
Measurement device: EcoSEC HLC-8320 (trade name, manufactured by Tosoh Corporation)
Columns: Two TOSOH TSKgel Super AWM-H's were connected
Carrier: 10 mM of LiBr/N-methylpyrrolidone
Measurement temperature: 40° C.
Carrier flow rate: 1.0 ml/min
Specimen concentration: 0.1% by mass
Detector: Refractive index (RI) detector
Standard specimen: Polystyrene <Measurement of Viscosity>

The viscosity of the specimen composition (1 mL) was measured using a B-type viscometer BL2 (trade name) manufactured by Tokyo Keiki Inc. The sample had left at the measurement start temperature in advance until the temperature of the sample became constant, and then measurement was started. The measurement temperature was set to 25° C. For the detailed measurement conditions and the like, description in HS Z8803:2011 9 "Methods for viscosity measurement using a single cylindrical rotational viscometer" was referred to. Five specimens were produced every level, and the average values were employed.

<Measurement of Film Thickness>

The film thicknesses of test specimens (the solid electrolyte layer and the active material layers) were measured as coated thicknesses using a KEITARO (trade name) manufactured by SEIKO EM according to JISK5600-1-7:2014. Meanwhile, in a case in which batteries are decomposed, it is possible to take out and measure ruptured surfaces using a scanning-type microscope or a tabletop microscope Miniscope™1000 (trade mark) manufactured by Hitachi High-Technologies Corporation. Five specimens were produced every level, film thicknesses were measured at two points in every specimen so as to obtain a total of ten thicknesses, and the average values were employed.

The present invention has been described together with the embodiment, but the present inventors do not mean to limit the present invention to any detailed parts in the description unless particularly otherwise described, and the present invention is supposed to be widely interpreted within the concept and scope of the present invention which are described in the accompanying claims.

EXPLANATION OF REFERENCES

1: negative electrode collector
2: negative electrode active material layer
3: inorganic solid electrolyte layer
4: positive electrode active material layer
5: positive electrode collector
6: operation section
10: all solid-state secondary battery
11: upper portion-supporting plate
12: lower portion-supporting plate
13: coin battery
14: coin case
15: electrode sheet
S: screw
21: lid
20, 30: crusher
22, 32: container
23: crushing particles
24: liquid mixture
23a: filling location of crushing particles
24a: filling location of liquid mixture
25, 35: space
V: crushing tank
R: rotation

What is claimed is:

1. A method for manufacturing inorganic solid electrolyte particles, comprising:
 a step of preparing a sulfide-based electrolyte as a raw material of the inorganic solid electrolyte particles;
 a step of feeding the raw material of the inorganic solid electrolyte particles, crushing particles, and a crushing medium into a mixing tank of a crusher; and
 a step of stirring the raw material of the inorganic solid electrolyte particles, the crushing particles, and the crushing medium in the mixing tank,
 wherein a density of the crushing particles is set to 0.9 g/cm³ or more and 2.4 g/cm³ or less.

2. The method for manufacturing inorganic solid electrolyte particles according to claim 1,
 wherein an average particle diameter of the crushing particles is set to 100 times or more and 1,500 times or less the average particle diameter of target inorganic solid electrolyte particles.

3. The method for manufacturing inorganic solid electrolyte particles according to claim 1,
 wherein an average particle diameter of the crushing particles is set to 1,000 times or more and 10,000 times or less the average particle diameter of target inorganic solid electrolyte particles.

4. A method for manufacturing a solid electrolyte composition, comprising:

preparing a composition of inorganic solid electrolyte particles which is used for all solid-state secondary batteries using the method for manufacturing inorganic solid electrolyte particles according to claim 1.

5. A method for manufacturing an electrode sheet for a battery, comprising:

a step of imparting a solid electrolyte composition obtained using the manufacturing method according to claim 4 onto a metal foil.

6. A method for manufacturing an all solid-state secondary battery, comprising:

manufacturing the all solid-state secondary battery using the method for manufacturing an electrode sheet for a battery according to claim 5.

* * * * *